(12) United States Patent
Baba et al.

(10) Patent No.: US 8,890,975 B2
(45) Date of Patent: Nov. 18, 2014

(54) IMAGE PROCESSING APPARATUS, SIGNAL PROCESSING METHOD AND COMPUTER-READABLE MEDIUM FOR IMAGE FLICKER CORRECTION

(75) Inventors: Shigeyuki Baba, Tokyo (JP); Shinichi Yoshimura, Tokyo (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 13/256,980

(22) PCT Filed: Jan. 5, 2011

(86) PCT No.: PCT/JP2011/050041
§ 371 (c)(1),
(2), (4) Date: Sep. 16, 2011

(87) PCT Pub. No.: WO2011/093112
PCT Pub. Date: Aug. 4, 2011

(65) Prior Publication Data
US 2012/0002074 A1 Jan. 5, 2012

(30) Foreign Application Priority Data

Jan. 29, 2010 (JP) ................. P2010-018714

(51) Int. Cl.
*H04N 9/73* (2006.01)
*G06K 9/40* (2006.01)
*H04N 5/235* (2006.01)

(52) U.S. Cl.
CPC ............ *H04N 5/235* (2013.01); *H04N 5/2357* (2013.01)
USPC .................. 348/228.1; 348/226.1; 348/227.1; 382/254; 382/274; 382/275

(58) Field of Classification Search
USPC ............................ 348/226.1–228.1, 366, 910
See application file for complete search history.

(56) References Cited

U.S. PATENT DOCUMENTS 7,298,401 B2 * 11/2007 Baer ........................ 348/226.1
7,639,285 B2 * 12/2009 Nomura et al. ............ 348/228.1

(Continued)

FOREIGN PATENT DOCUMENTS

JP 11-122513 4/1999
JP 2001-016508 1/2001

(Continued)

*Primary Examiner* — Roberto Velez
*Assistant Examiner* — Quam Pham
(74) *Attorney, Agent, or Firm* — Finnegan, Henderson, Farabow, Garrett & Dunner L.L.P.

(57) ABSTRACT

An apparatus and a method which enable effective removal of flicker are provided. Under an illumination environment such as a fluorescent lamp with luminance variation, flicker that occurs in images shot with an X-Y address scanning type imaging device such as a CMOS is effectively removed or reduced. The integral value of the row-by-row signal intensity of an image to be corrected from which to remove flicker is calculated, and this integral value is used to detect flicker components contained in individual rows of an image frame. The detected flicker components represent data according to the actual flicker waveform of the illumination, and a correction process is executed using flicker correction coefficients formed by an anti-phase pattern of the flicker components. Effective flicker removal becomes possible through this process.

13 Claims, 13 Drawing Sheets

(56) References Cited

U.S. PATENT DOCUMENTS

| | | | |
|---|---|---|---|
| 2006/0055823 A1* | 3/2006 | Kinoshita et al. | 348/511 |
| 2007/0024713 A1* | 2/2007 | Baer et al. | 348/207.99 |
| 2007/0046789 A1* | 3/2007 | Kirisawa | 348/226.1 |
| 2007/0053013 A1* | 3/2007 | Takahashi | 358/474 |
| 2009/0135276 A1* | 5/2009 | Urisaka | 348/241 |
| 2009/0219409 A1* | 9/2009 | Mikami | 348/226.1 |
| 2010/0053369 A1* | 3/2010 | Nagai | 348/226.1 |

FOREIGN PATENT DOCUMENTS

| | | |
|---|---|---|
| JP | 2004-222228 | 8/2004 |
| JP | 2005-347939 | 12/2005 |
| JP | 2007-174537 | 7/2007 |
| JP | 2009-130845 | 6/2009 |

\* cited by examiner

FIG. 12
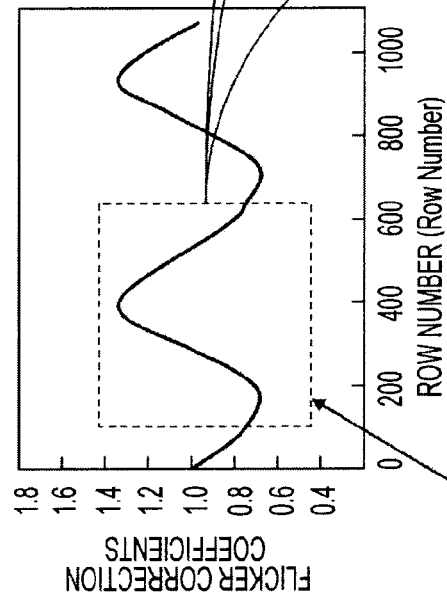
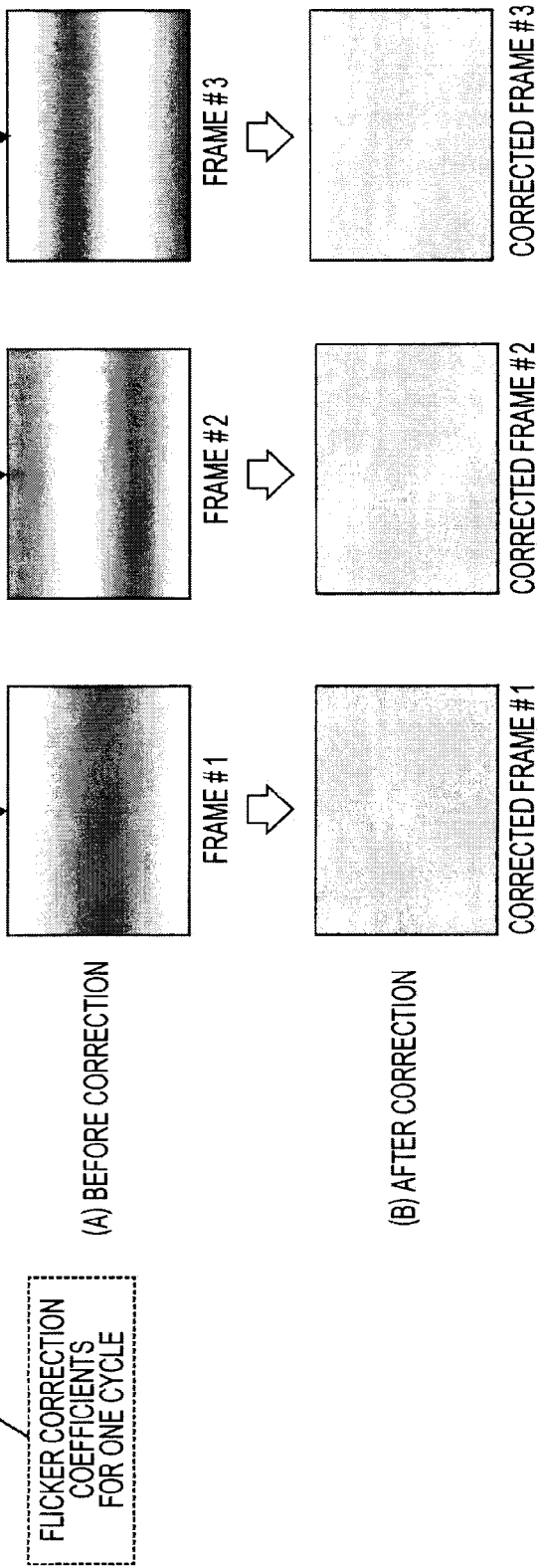

IMAGE PROCESSING APPARATUS, SIGNAL PROCESSING METHOD AND COMPUTER-READABLE MEDIUM FOR IMAGE FLICKER CORRECTION

TECHNICAL FIELD

The present invention relates to an image processing apparatus, a signal processing method, and a program. More specifically, the present invention relates to an image processing apparatus, a signal processing method, and a program, which generate images in which flicker occurring in images shot with a camera is suppressed.

BACKGROUND ART

When an image is shot with a camera including an X-Y address scanning type imaging device such as a complementary metal oxides semiconductor (CMOS) imaging device under illumination of a fluorescent lamp, luminance non-uniformity or color non-uniformity in the form of stripes occurs in the picture signal. This phenomenon is called flicker. This results from the fact that a fluorescent lamp connected to a commercial power supply (AC) basically repeats flashing at a cycle twice the power supply frequency, and the operating principle of an imaging device.

Referring to FIG. 1, a description will be given of the principle of how flicker occurs in images shot with a CMOS image sensor. FIG. 1 shows the following pieces of data.
 (a) Luminance variation of a fluorescent lamp
 (b) Schematic diagram of the imaging (exposure) sequence of a CMOS image sensor
 (c) Readout timing of CMOS images
 (d) Conceptual illustration of output images
In FIG. 1, time (t) elapses from left to right.

It is assumed that the fluorescent lamp is operating in the 50 Hz commercial power supply region. In this case, the fluorescent lamp repeats flashing at a frequency of 100 Hz, which is twice the power supply frequency (50 Hz). The arcuate curves shown in (a) indicate luminance variation of the fluorescent lamp. Luminance variation is produced at 100 Hz, that is, in cycles of 1/100 seconds.

Under such an illumination environment, images are shot with a CMOS image sensor having a rolling shutter at a frame rate of 60 frames per second. The exposure process is performed sequentially from the top row (ROW) toward the bottom row (ROW) in each shot frame with the elapse of time.

In the schematic diagram of imaging of the CMOS image sensor shown in (b), the dotted diagonal lines are lines indicating reset timing of the image sensor, and solid diagonal lines are lines indicating readout timing. Exposure is started after the reset indicated by the dotted lines, and the period until the readout timing indicated by the solid lines is the exposure time. Exposure is performed from the scan line at the top of a frame toward the scan line at the bottom by the rolling shutter.

The region bounded by two adjacent solid diagonal lines indicates one frame of the image sensor. Within the exposure time sandwiched by each dotted line and solid line, luminance variation corresponding to luminance variation of illumination occurs. That is, since the exposure timing differs for each of rows that make up an image frame, due to the influence of the light source with luminance variation, non-uniformity in the form of horizontal stripes, or so-called flicker occurs as indicated by the (d) output images in FIG. 1.

The (d) output images in FIG. 1 indicate four consecutively shot images, frame #1 to frame #4, which are image frames #1 to #4 that make up moving images shot at a frame rate of 60 frames per second (60 fps).

A top portion p, a middle portion q, and a bottom portion r are shown in frame #3. These are shown for explicitly indicating positions corresponding to exposure times p, q, and r in the schematic diagram of imaging of the CMOS image sensor shown in (b).

The top portion p of frame #3 is the row portion subjected to exposure in a period during which the luminance of the fluorescent lamp is bright.

The middle portion q of frame #3 is the row portion subjected to exposure in a period during which the luminance of the fluorescent lamp changes from a dark period to a bright period.

The bottom portion r of frame #3 is the row portion subjected to exposure in a period during which the luminance of the fluorescent lamp is dark.

Stripe patterns based on luminance non-uniformity or color non-uniformity occurs because the fluorescent lamp luminance in the exposure period of each row (Row) is not consistent as described above.

It should be noted that a typical imaging device has such a configuration that, for example, one of RGB frequencies of light is selectively inputted for each of pixels that make up the imaging device. As this RGB arrangement, for example, the Bayer arrangement is known. For example, when imaging is performed with a color image sensor having the Bayer arrangement or the like, due to the decay characteristic of the phosphor of the fluorescent lamp, the degree of influence of flicker differs for each color signal (color channel), and color non-uniformity occurs due to the difference in amplitude and phase.

For example, PTL 1 (Japanese Unexamined Patent Application Publication No. 2007-174537) exists as related art disclosing a technology for preventing or suppressing such flicker. PTL 1 (Japanese Unexamined Patent Application Publication No. 2007-174537) discloses a process that controls the exposure time of the imaging device through setting of the electronic shutter or the like, thereby adjusting the exposure time of each row of a single shot image to reduce the difference in brightness between rows. However, there is a problem in that this technique places a constraint on the exposure time of the imaging device, making it impossible to set the electronic shutter in an arbitrary manner in accordance with the shooting environment, resulting in a decrease in the degree of freedom of shooting.

Also, to avoid the above-mentioned problem, PTL 2 (Japanese Unexamined Patent Application Publication No. 2005-347939) proposes a configuration that performs a correction process on an image signal obtained by a shooting process to thereby suppress the influence of fluorescent lamp flicker within the picture signal.

In this PTL 2 (Japanese Unexamined Patent Application Publication No. 2005-347939), the lighting waveform (flicker waveform) of a fluorescent lamp is approximately modeled by a sine wave, and then a correction process is performed by changing the correction gain used at the time of a correction process on an image signal shot with a camera, in accordance with the approximation model. Through this correction process, the image signal is corrected in accordance with the lighting waveform (flicker waveform) of the fluorescent lamp, thereby realizing a configuration that suppresses the difference in brightness between rows in the shot image.

However, the actual luminance variation of a fluorescent lamp does not necessarily match the sine wave as the approximation model used in PTL 2. FIG. 2 is a comparison diagram between the sinusoidal approximation model and an example of the actual luminance variation of a fluorescent lamp. For example, under such a condition that ripple is present in a commercial power supply, as shown in FIG. 2, the actual lighting waveform (solid line) of the fluorescent lamp and the model waveform (dotted line) exhibit different luminance variations.

The luminance variation of a typical fluorescent lamp does not coincide with the sinusoidal approximation model. In many cases, complex luminance variation is produced as indicated by the solid line shown in FIG. 2.

The process in PTL 2 described above does not take this divergence between the sinusoidal approximation model and reality into consideration, and thus there is a problem in that even when a flicker correction process using the model waveform is performed, the influence of flicker based on the real luminance variation of the fluorescent lamp remains in the image obtained as a result of the correction process.

The influence of flicker based on the real luminance variation of the fluorescent lamp becomes more pronounced as the exposure time becomes shorter. As the exposure becomes shorter, the interval between the solid and dotted diagonal lines shown in FIG. 1(b) becomes smaller, with a result that the influence of flicker based on the actual luminance variation of the fluorescent lamp becomes stronger.

FIG. 3 and FIG. 4 show variation of a flicker waveform due to the difference in exposure time of an imaging device (image sensor). It should be noted that herein, a flicker waveform is a waveform indicating luminance non-uniformity of each row which appears in the shot image.

Both FIG. 3 and FIG. 4 show the waveforms of flicker within the picture signal when shooting at 60 frames/second (60 fps) with a CMOS image sensor having a roller shutter. The flicker waveforms of frames #1 to #4 that are four consecutive frames are shown.

In each graph, the horizontal reading represents the row number in the image sensor, and the vertical axis represents the normalized luminance (flicker luminance) of each row. It should be noted that the normalized luminance represents information comparing relative luminance on a row-by-row basis which is generated while excluding the influence of the luminance of a subject.

FIG. 3 shows the flicker waveforms of frames #1 to #4 in the case when the exposure time of the image sensor is long at $\frac{1}{60}$ [sec].

FIG. 4 shows the flicker waveforms of frames #1 to #4 in the case when the exposure time of the image sensor is short at $\frac{1}{500}$ [sec].

In the case of the long exposure time of $\frac{1}{60}$ [sec] shown in FIG. 3, the flicker waveform appearing in each of image frames #1 to #4 exhibits a gentle curve. This is a line close to the since wave as the model waveform described above with reference to FIG. 2.

On the other hand, in the case of the short exposure time of $\frac{1}{500}$ [sec] shown in FIG. 4, unlike the curve close to the sine wave shown in FIG. 3, the flicker waveform appearing in each of image frames #1 to #4 is a line close to the actual waveform described above with reference to FIG. 2.

In this way, as the exposure time of the CMOS image sensor becomes shorter, the distribution of luminance non-uniformity/color non-uniformity in the form of horizontal stripes due to fluorescent lamp flicker which appears in the picture signal becomes closer to the actual flicker waveform.

In the case of high frame rate imaging which is becoming commonplace in recent years, and high speed shutter imaging in wide dynamic range imaging, shooting is executed with short exposure time. In such a shooting process, the divergence between the model waveform and the actual flicker waveform becomes apparent on the picture as well. Therefore, with the signal processing method using a model waveform described in PTL 2 mentioned above, it is not possible to perform effective correction that suppresses occurrence of flicker.

CITATION LIST

Patent Literature

PTL 1: Japanese Unexamined Patent Application Publication No. 2007-174537
PTL 2: Japanese Unexamined Patent Application Publication No. 2005-347939

SUMMARY OF INVENTION

Technical Problem

The present invention has been made in view of the above-mentioned circumstances, for example, and accordingly the object of the present invention is to provide an image processing apparatus, a signal processing method, and a program which estimates the actual luminance variation of illumination at the time of image shooting by using shot images, rather than using a model waveform of the luminance variation of illumination of a fluorescent lamp, and executes a correction process using this estimated actual waveform, specifically, an image correction process by setting a correction gain that takes the estimated actual waveform into consideration, thereby making it possible to effectively prevent or suppress occurrence of flicker.

Solution to Problem

A first aspect of the present invention resides in an image processing apparatus including
an integration processing section that takes an input of image data shot with an X-Y address scanning type imaging device, and calculates an integral value of a row-by-row signal intensity,
a flicker component calculating section that detects flicker components contained in individual rows of an image frame by using the integral value of the row-by-row signal intensity,
a flicker correction coefficient calculating section that calculates flicker correction coefficients formed by an anti-phase pattern of the flicker components calculated by the flicker component calculating section, and
a correcting section that executes a correction process using the flicker correction coefficients calculated by the flicker correction coefficient calculating section.

Further, in an embodiment of the image processing apparatus according to the present invention, the flicker component calculating section performs a process of detecting flicker components contained in individual rows of an image frame whose flicker components are to be detected, by comparing between an integral value of a row-by-row signal intensity of the image frame whose flicker components are to be detected, and a plural-frames integrated signal intensity representing a row-by-row signal intensity of an integrated frame obtained by summing signal values of corresponding pixels in reference frames, the reference frames being defined as a plurality of image frames included in one unit of a frame cycle in which flicker of the same phase occurs.

Further, in an embodiment of the image processing apparatus according to the present invention, the image processing apparatus further includes a still frame detecting section that detects still frames with no subject motion from among consecutive image frames, and the flicker component calculating section selects the reference frames from among the still frames detected by the still frame detecting section.

Further, in an embodiment of the image processing apparatus according to the present invention, the flicker correction coefficient calculating section takes an input of flicker phase information of an image frame whose flicker is to be corrected, from a phase shift quantity calculating section, and calculates flicker correction coefficients corresponding to the image frame which are phase-adjusted in accordance with the flicker phase information.

Further, in an embodiment of the image processing apparatus according to the present invention, the image processing apparatus further includes a flicker component synthesizing section that generates synthetic flicker components by selecting only flicker components of high reliability from the flicker components for each frame which are calculated by the flicker component calculating section, and synthesizing flicker components in a plurality of frames, and the flicker correction coefficient calculating section calculates flicker correction coefficients formed by an anti-phase pattern of the synthetic flicker components.

Further, in an embodiment of the image processing apparatus according to the present invention, the flicker component synthesizing section performs a process of determining reliabilities of the flicker components for each frame on a basis of luminance information of an image frame, and selects, as the flicker components of high reliability, only flicker components corresponding to pixels having a luminance equal to or higher than a pre-specified luminance threshold.

Further, in an embodiment of the image processing apparatus according to the present invention, the integration processing section calculates the integral value of the row-by-row signal intensity for each of individual color signals (color channels), the flicker component calculating section detects the flicker components for each of the individual color signals, the flicker correction coefficient calculating section calculates the flicker correction coefficients for each of the individual color signals, and the correcting section executes the correction process using the flicker correction coefficients for each of the individual color signals which are calculated by the flicker correction coefficient calculating section.

Further, in an embodiment of the image processing apparatus according to the present invention, the image processing apparatus further includes a flicker scene determining section that determines whether or not an input image has been shot under an illumination environment that causes flicker, and in the flicker scene determining section, if the image has been shot under the illumination environment that causes flicker, the correction process is executed by calculating the flicker correction coefficients.

Further, in an embodiment of the image processing apparatus according to the present invention, the image processing apparatus executes the correction process using the flicker correction coefficients for each set of consecutively shot images with the same exposure time, as a process prior to generating a wide dynamic range image by synthesizing a plurality of images with different exposure times.

Further, in an embodiment of the image processing apparatus according to the present invention, the X-Y address scanning type imaging device is a complementary metal oxides semiconductor (CMOS) imaging device.

Further, a second aspect of the present invention resides in an imaging apparatus including an imaging section, and a signal processing section that executes image processing according to any one of the above descriptions.

Further, a third aspect of the present invention resides in a signal processing method which is executed in an image processing apparatus, including an integration processing step of an integration processing section taking an input of image data shot with an X-Y address scanning type imaging device, and calculating an integral value of a row-by-row signal intensity, a flicker component calculating step of a flicker component calculating section detecting flicker components contained in individual rows of an image frame by using the integral value of the row-by-row signal intensity, a flicker correction coefficient calculating step of a flicker correction coefficient calculating section calculating flicker correction coefficients formed by an anti-phase pattern of the flicker components calculated in the flicker component calculating step, and a correcting step of a correcting section executing a correction process using the flicker correction coefficients calculated in the flicker correction coefficient calculating step.

Further, a fourth aspect of the present invention resides in a program for causing signal processing to be executed in an image processing apparatus, including an integration processing step of causing an integration processing section to take an input of image data shot with an X-Y address scanning type imaging device, and calculate an integral value of a row-by-row signal intensity, a flicker component calculating step of causing a flicker component calculating section to detect flicker components contained in individual rows of an image frame by using the integral value of the row-by-row signal intensity, a flicker correction coefficient calculating step of causing flicker correction coefficient calculating section to calculate flicker correction coefficients formed by an anti-phase pattern of the flicker components calculated in the flicker component calculating step, and a correcting step of causing a correcting section to execute a correction process using the flicker correction coefficients calculated in the flicker correction coefficient calculating step.

It should be noted that the program according to the present invention is, for example, a program that can be provided to an information processing apparatus or computer system capable of executing a variety of program codes, via a storage medium or communication medium that is provided in a computer-readable format. By providing such a program in a computer-readable format, processes according to the program are implemented on the information processing apparatus or computer system.

Other objects, features, and advantages of the present invention will become apparent from the following detailed description of embodiments of the present invention and the accompanying drawings. It should be noted that the term system as used in this specification refers to a logical aggregation of a plurality of devices, and is not limited to one in which the constituent devices exist within the same casing.

Advantageous Effects of Invention

According to the configuration of an embodiment of the present invention, a configuration is realized which effectively removes or reduces flicker that occurs in image data shot with an X-Y address scanning type imaging device such as a CMOS, under an illumination environment such as a fluorescent lamp with luminance variation. An image processing apparatus according to the present invention calculates the integral value of the row-by-row signal intensity of an image to be corrected from which to remove flicker, and uses this integral value to detect flicker components contained in individual rows of an image frame. The detected flicker components represent data according to the actual flicker waveform of the illumination. Flicker correction coefficients formed by an anti-phase pattern of the flicker components are calculated, the quantity of phase fluctuation in flicker component is detected and reflected to the correction coefficients whenever necessary, and a correction process using the flicker correction coefficients is executed. Through this process, correction according to the actual flicker waveform becomes possible, and effective removal of flicker is realized.

BRIEF DESCRIPTION OF DRAWINGS

FIG. 12 is a diagram explaining about a correction process using flicker correction coefficients calculated by a flicker correction coefficient calculating section 207.

DESCRIPTION OF EMBODIMENTS

Hereinbelow, an image processing apparatus, a signal processing method, and a program according to the present invention will be described with reference to the drawings. It should be noted that the embodiments described below are embodiments using an imaging apparatus that uses a CMOS image sensor as an X-Y address scanning type imaging device. Also, the process example assumes that the illumination environment under which images are shot is the illumination environment of a fluorescent lamp at a power supply frequency of 50 Hz, and that as the shot images, shooting of pictures has been performed at 60 frames/second (60 fps). It should be noted, however, that the present invention is not limited to the shooting conditions set as mentioned above but can be applied as processing for images shot under various shooting environments.

Description will be given in the following order of topics.
1. With regard to an example of the configuration of an image processing apparatus
2. With regard to details of the configuration and processing of a flicker correction processing section
3. With regard to an example of the process sequence of the image processing apparatus according to the present invention
4. With regard to processing corresponding to a wide dynamic range image

[1. With Regard to an Example of the Configuration of an Image Processing Apparatus]

First, with reference to FIG. 5, a description will be given of an example of the configuration of an imaging apparatus as an embodiment of an image processing apparatus according to the present invention.

Figure 5:
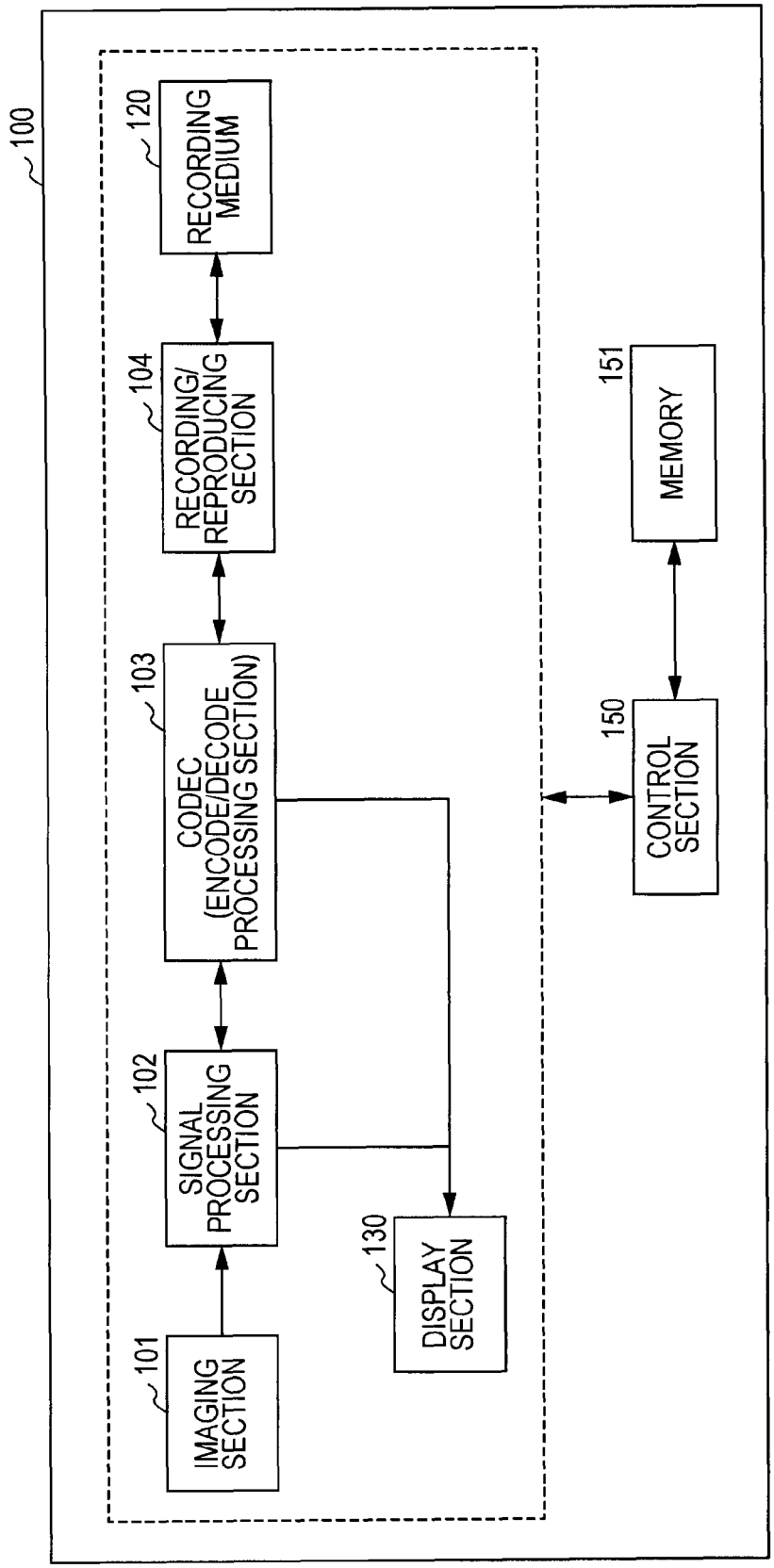
FIG. 5 is a diagram explaining about an example of the configuration of an imaging apparatus as an embodiment of an image processing apparatus according to the present invention.

FIG. 5 is a block diagram showing the overall configuration of an imaging apparatus 100 according to an embodiment of the present invention. The imaging apparatus 100 has an imaging section 101, a signal processing section 102, a codec (encode/decode processing section) 103, a recording/reproducing section 104, a recording medium 120, a display section 130, a control section 150, and a memory 151.

The imaging section 101 is formed by a lens, an imaging device, and the like. The imaging device is a CMOS image sensor that is an X-Y address scanning type imaging device. With the CMOS image sensor as an X-Y address scanning type imaging device, as described above with reference to FIG. 1, the exposure process is performed sequentially from the top row toward the bottom row with the elapse of time. The light signal received by the CMOS image sensor is subjected to photoelectric conversion, and inputted to the signal processing section 102 as an electrical signal.

The signal processing section 102 executes a flicker correction process according to the present invention, in addition to processing such as white balance adjustment, gamma correction, or demosaicing executed as general camera signal processing. Details of the configuration and processing of a flicker correction processing section that executes the flicker correction process will be described later with reference to FIG. 6 onwards.

Data obtained as a result of signal processing in the signal processing section 102 is inputted to the codec (encode/decode processing section) 103. Also, the data is outputted to the display section 130, and a display process is executed. In the codec 130, for example, a pre-specified coding process such as an MPEG coding process is executed, and the processing result is outputted to the recording/reproducing section 104.

The recording/reproducing section 104 executes a recording process of shot images to the recording medium 120, in accordance with a pre-specified format. The recording medium 120 is, for example, a data-recordable medium such as a flash memory, a magnetic disk, or an optical disc.

It should be noted that when reproducing images recorded on the recording medium 120, the recording/reproducing section 104 executes readout of data from the recording medium 120, the data read out is provided to the codec 130, and a decoding process is executed. The image obtained as a result of the decoding process is displayed on the display section 130.

It should be noted that control of each of these structural sections is executed by the control section 150 in accordance with a program previously recorded in the memory 151. The control section 150 has a CPU having a program execution function. The memory 151 is formed by a RAM, a ROM, or the like.

[2. With Regard to Details of the Configuration and Processing of a Flicker Correction Processing Section]

Next, with reference to FIG. 6, a description will be given of an example of the configuration of a flicker correction processing section that is set as part of the configuration in the signal processing section 102.

Figure 6:
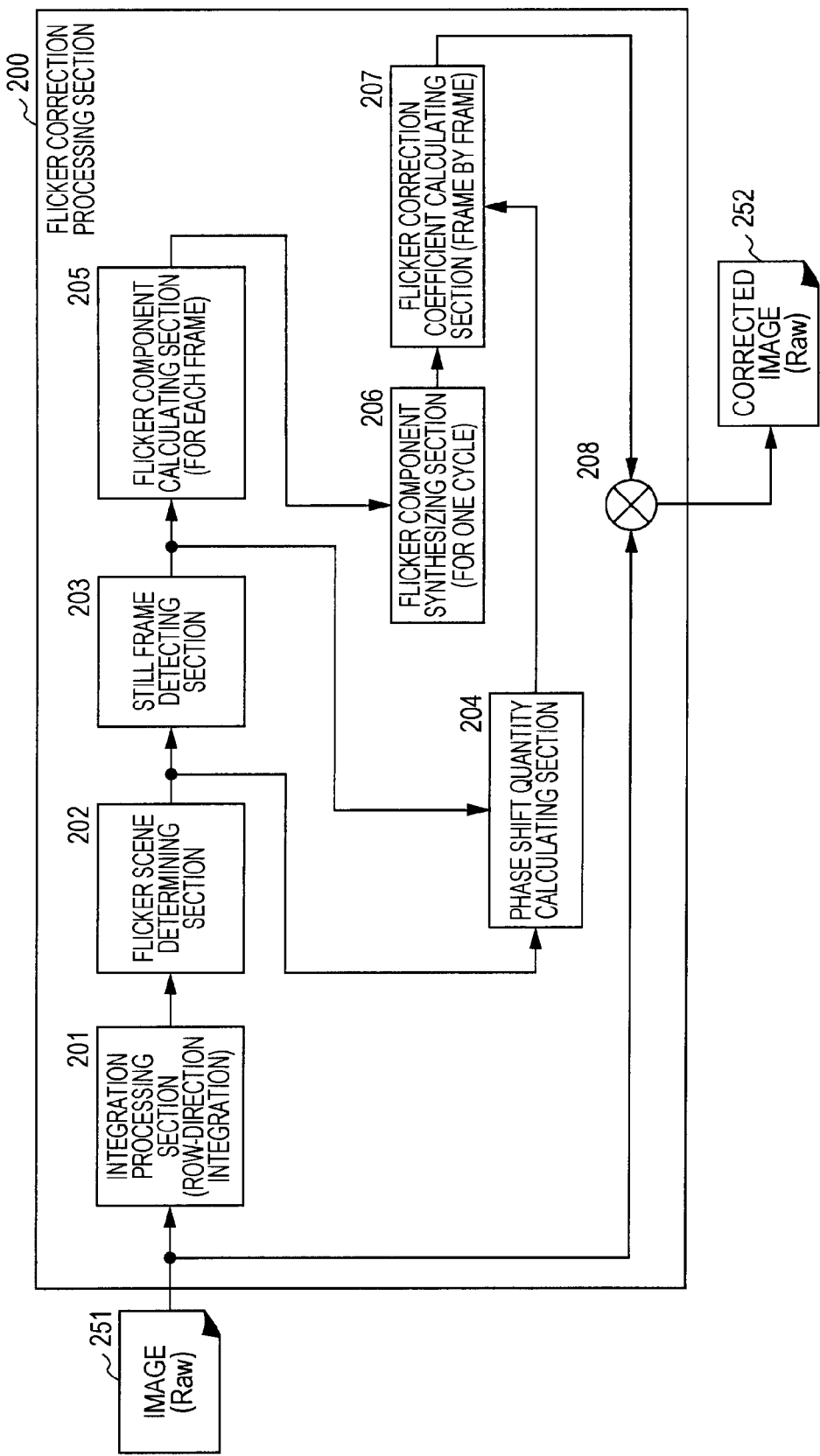
FIG. 6 is a diagram explaining about details of the configuration and processing of a flicker correction processing section that executes a flicker correction process.

FIG. 6 is a block diagram showing the overall configuration of a flicker correction processing section 200 according to an embodiment of the present invention.

In the embodiment described below, the flicker correction processing section 200 takes an input of a RAW image acquired by the image sensor that makes up the imaging section 101, and performs a flicker correction process on the RAW image. It should be noted that the RAW image is data immediately after being outputted from the image sensor, and is raw data before being subjected to signal processing such as a demosaicing process. A demosaicing process is a process that sets all the pixel values of RGB, for example, as data corresponding to each pixel in the image sensor. RAW data prior to execution of a demosaicing process is data in which, for example, only the pixel value of one of RGB is set for each pixel in the image sensor.

The flicker correction processing section 200 shown in FIG. 6 takes an input of a RAW image 251 prior to being subjected to a demosaicing process, and generates a corrected image 252 obtained by applying flicker correction to the RAW image 251. It should be noted, however, that this process is an example. The flicker correction processing section 200 can take an input of a color image on which a demosaicing process has been executed, and perform the same processing as described below on the color image to thereby realize a flicker correction process.

Processing of the flicker correction processing section 200 shown in FIG. 6 will be described.

The flicker correction processing section 200 has an integration processing section 201, a flicker scene determining section 202, a still frame detecting section 203, a phase shift quantity estimating section 204, a flicker component calculating section 205, a flicker component synthesizing section 206, a correction coefficient calculating section 207, and a multiplication section 208.

In the flicker correction processing section 200, first, the RAW image 251 is inputted to the integration processing section 201. The integration processing section 201 performs an integration process of a signal value (pixel value) for each of color channels in the horizontal direction of the RAW image 251, and obtains a row-by-row one-dimensional signal intensity (RP: Row Profile). As described above, RAW data is data in which, for example, the pixel value of only one of RGB is set for each pixel in the image sensor.

The integration processing section 201 performs an integration process for each of the color channels of RGB, for example, in the horizontal direction of the RAW image 251, and obtains a row-by-row one-dimensional signal intensity (RP: Row Profile).

This is a computation process that is performed for the purpose of reducing the quantity of data in the early stage of processing in order to reduce the computational complexity of a flicker correction process, and is performed under the assumption that the influence of flicker on a shot image is substantially the same with respect to the scan line (horizontal) direction of the image. Of course, in reality, it is possible that even with respect to the horizontal direction, each region of the image is subject to different illumination conditions and the like, and different degrees of influence of flicker. In that case as well, the correction process can be realized by applying the method proposed by the present invention for each of regions that are split in the horizontal direction.

For example, in the case of an image sensor of a Bayer arrangement type, an integration process is performed row by row independently for each of the R, G, and B channels, and as row-by-row one-dimensional signal intensities (RP) for the respective RGB channels, signal intensities: $RP\_Rk(y)$, $RP\_Gk(y)$, and $RP\_Bk(y)$ are obtained.

It should be noted that k denotes the frame number of an image, and y denotes the coordinate value in the vertical direction of the image.

In this way, for input RAW image frame k, the integration processing section 201 calculates signal intensities: $RP\_Rk(y)$, $RP\_Gk(y)$, and $RP\_Bk(y)$ on a per row (y) basis.

It should be noted that as processing techniques, these two techniques exist:

(1) a technique that executes processing individually on a per color signal component, for example, RGB color channel basis; and (2) a technique that calculates a single signal intensity $RPk(y)$ on a row-by-row basis without differentiating between color channels (for example, RGB), and uses this to execute processing common to pixels corresponding to all of the color channels.

An effective flicker reduction effect can be exerted by performing either of these processes. It should be noted that the processing on a per RGB color channel basis in (1) can enhance the color non-uniformity reduction effect.

The processing in the flicker correction processing section 200 may be executed as either of the processes (1) and (2) mentioned above. In the following, a description will be given of an example of processing performed as the processing on a per RGB color channel basis. It should be noted that in the following description, when an indication of RGB is appended as in $RP\_RK(y)$, $RP\_GK(y)$, $RP\_BK(y)$, and the like, this indicates that the processing is performed individually, and when RGB is not appended as in $RPk(y)$ and the like, this indicates that the processing is executed commonly to the respective RGB color channels.

The signal intensities: $RP\_RK(y)$, $RP\_GK(y)$, and $RP\_BK(y)$ calculated by the integration processing section 201 are inputted to the flicker scene determining section 202.

The flicker scene determining section 202 performs a process (flicker determination) for determining whether or not a shot image has been shot under a fluorescent lamp environment that causes flicker.

The flicker scene determining section 202 uses a one-dimensional discrete Fourier transform (DFT) to determine, on the basis of the power spectrum distribution, whether or not a 100 Hz flicker component is contained in the one-dimensional signal intensities $RP\_R$, $RP\_G$, and $RP\_B$.

This process may be performed either individually for each of the RGB color channels as described above, or may be performed collectively.

This embodiment executes processing that assumes detection of flicker under illumination of a fluorescent lamp at 50 Hz. As described above with reference to FIG. 1, illumination of a fluorescent lamp at 50 Hz produces luminance variation at a cycle of 100 Hz.

Figure 1:
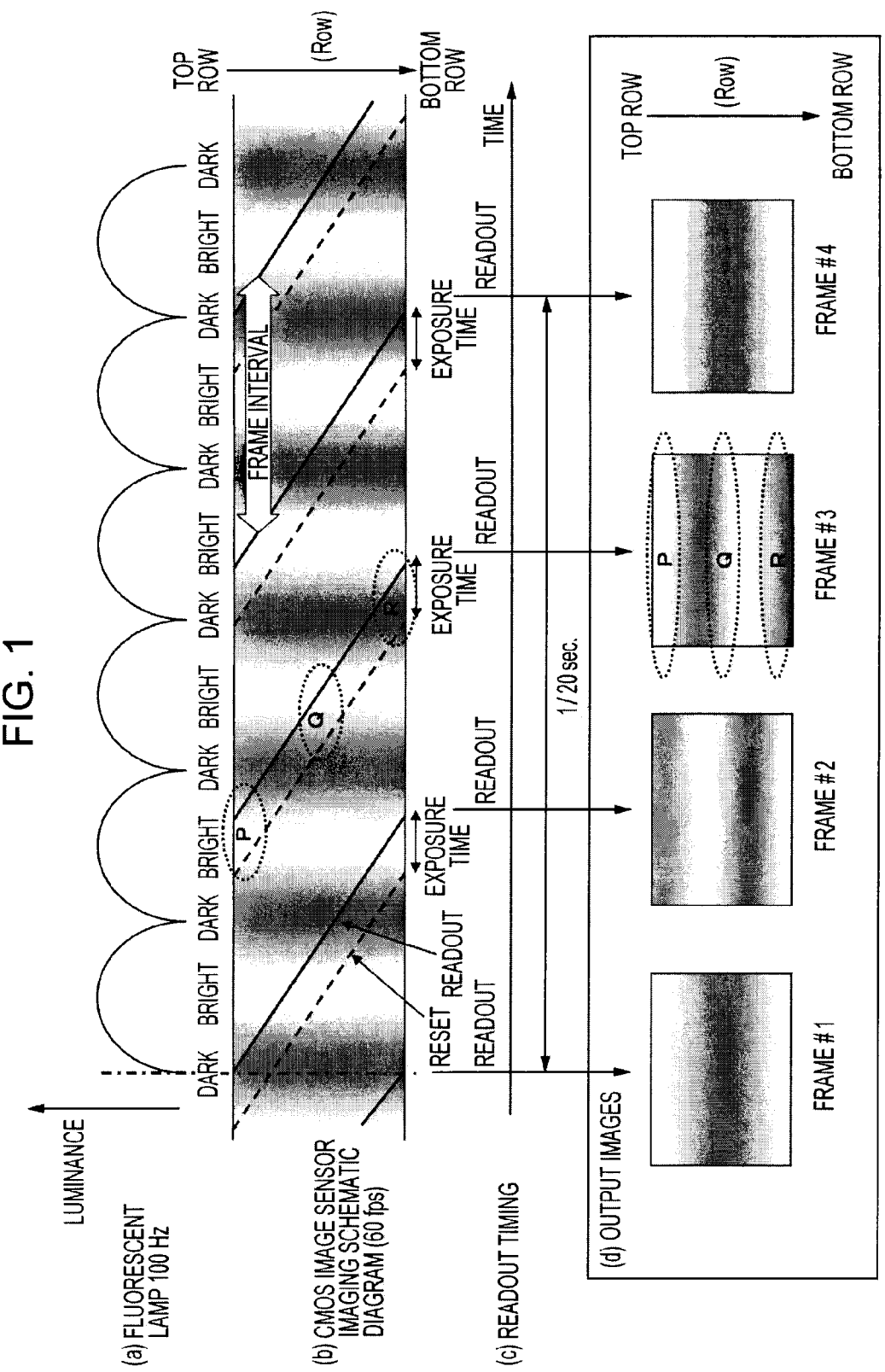
FIG. 1 is a diagram explaining about the principle of how flicker occurs in images shot with a CMOS image sensor.
Figure 2:
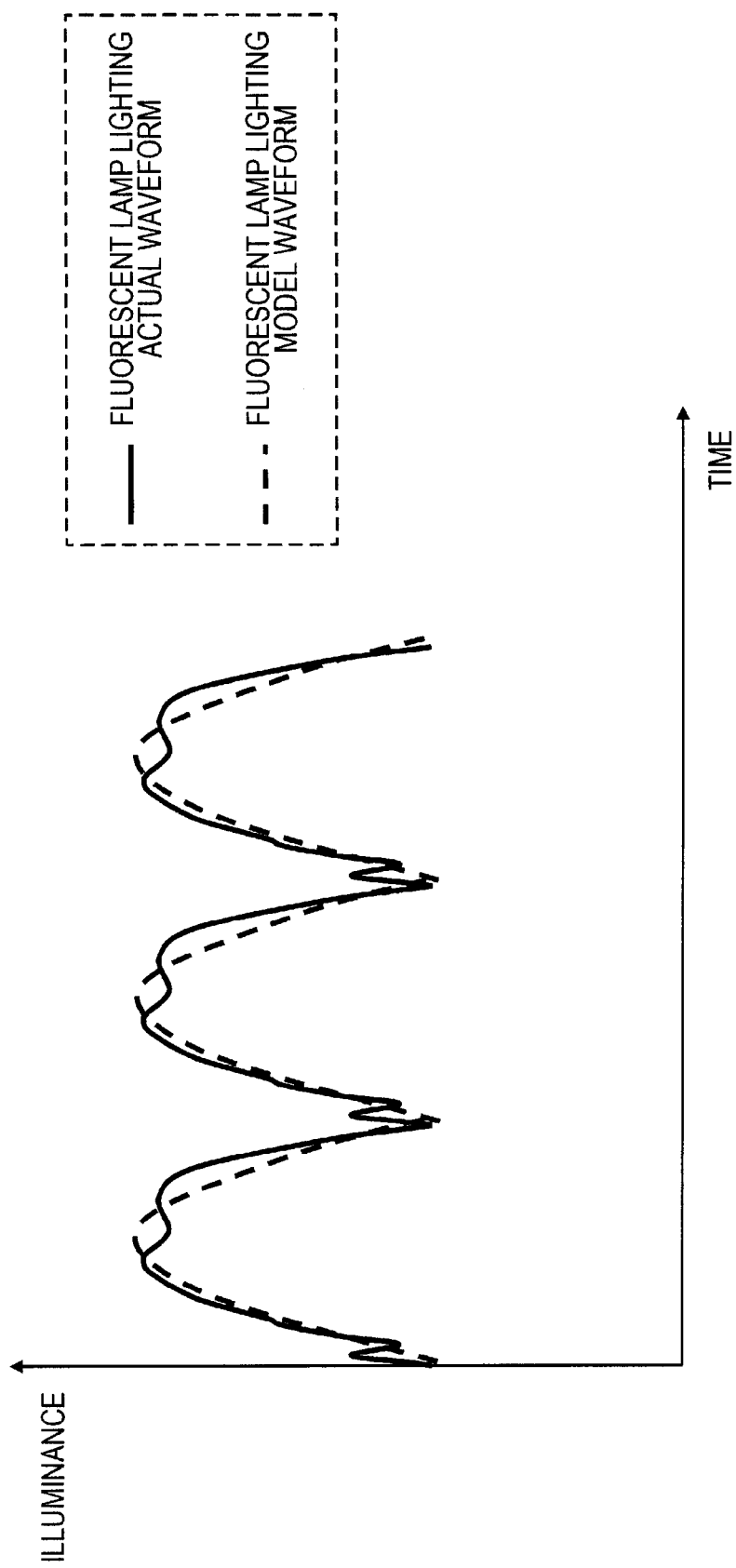
FIG. 2 is a comparison diagram between a sinusoidal approximation model and an example of the actual luminance variation of a fluorescent lamp.
Figure 3:
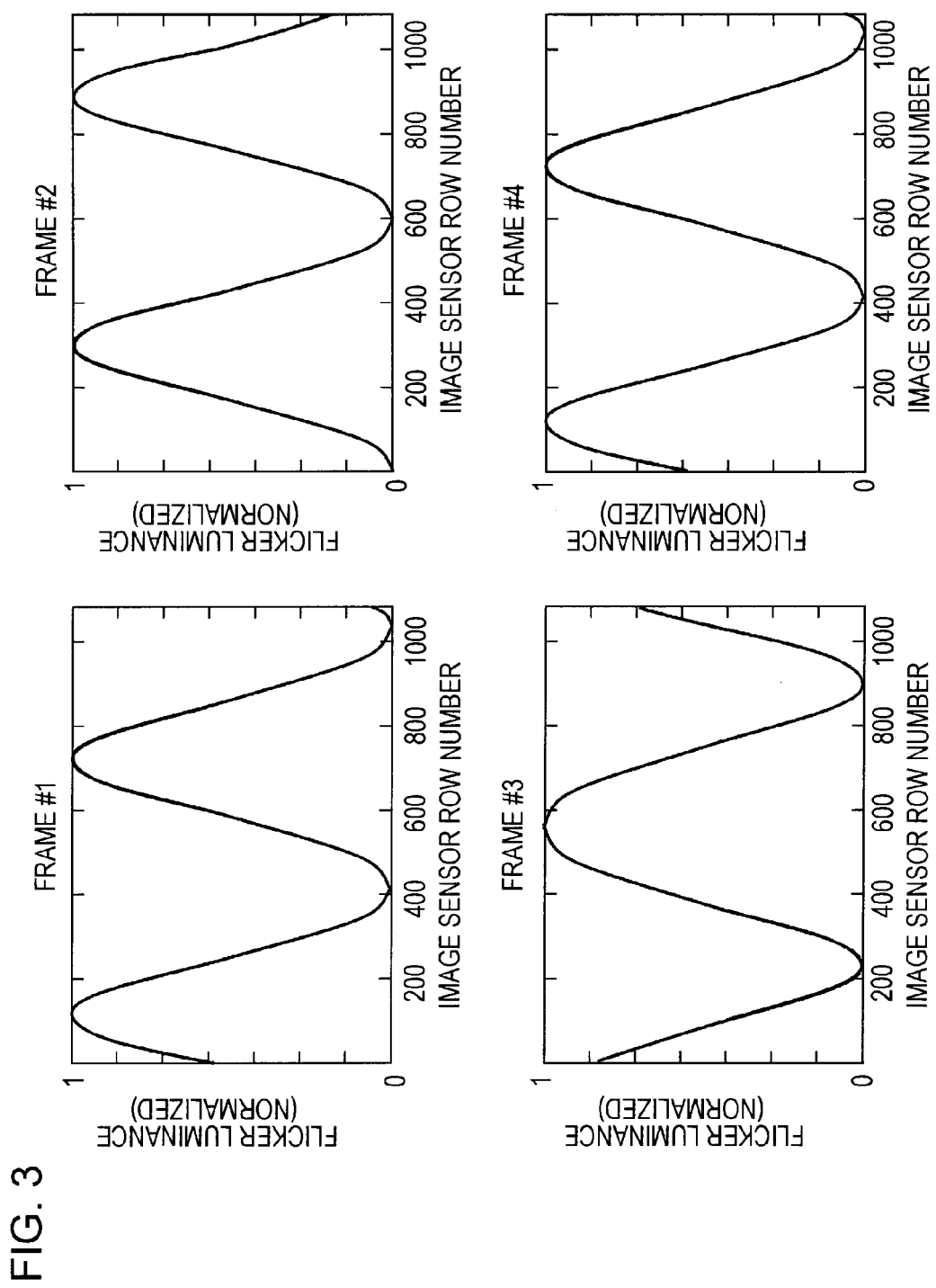
FIG. 3 is a diagram showing variation of a flicker waveform due to the difference in exposure time of an imaging device (image sensor).
Figure 4:
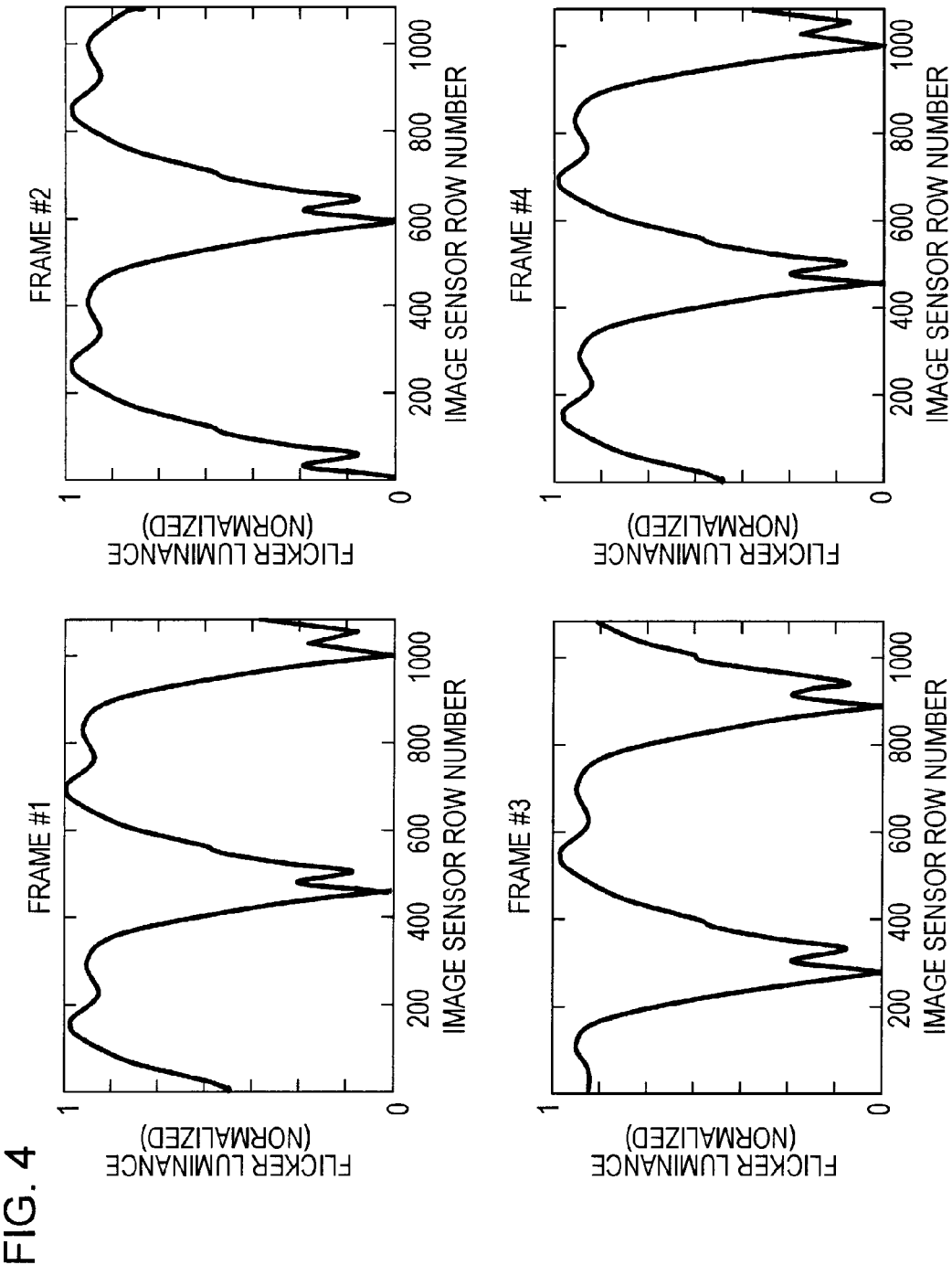
FIG. 4 is a diagram showing variation of a flicker waveform due to the difference in exposure time of an imaging device (image sensor).

When images are shot at 60 frames/second (60 fps) under the illumination with a luminance variation cycle of 100 Hz, as can be appreciated from FIG. 1, frame #1 and frame #4 are shot at the same luminance variation timing of the illumination. That is, the flicker waveforms of frame n and frame n+3 are the same.

That is, when images are shot at 60 frames/second (60 fps) under the illumination having a luminance variation cycle of 100 Hz, three kinds of flicker waveforms appear in these consecutive image frames:
 frame n;
 frame n+1; and
 frame n+2.

Thereafter, ideally, the three kinds of flicker waveforms are repeated. Strictly speaking, although there is a possibility that the phase of flicker progressively deviates due to a deviation in imaging cycle or power supply frequency fluctuations, for neighboring frames, the processing can be performed on the assumption of this periodicity.

In the case of the current shooting conditions that images be shot at 60 fps under illumination of a fluorescent lamp at 50 Hz, the phases of flicker coincide every three frames so that a 100 Hz component of flicker can be easily detected.

The flicker scene determining section 202 first calculates row-by-row signal intensities: $RP_{k-1}(y)$, $RP_k(y)$, and $RP_{k+1}(y)$ for three consecutive frames, frames k−1 to k+1, corresponding to a "same-flicker-occurring-frame cycle".

Next, using the row-by-row signal intensities for these three consecutive frames, a flicker component index value $FL_k(y)$ corresponding to frame k is calculated in accordance with the following equation.

$$FL_k(y) = 3RP_k(y)/RP_{k-1}(y) + RP_{k+1}(y)$$

The flicker component index value $FL_k(y)$ calculated in accordance with the above-mentioned equation becomes a value close to 1 in the case where there are few flicker components, because the values of the denominator ($RP_{k-1}(y)+RP_k(y)+RP_{k+1}(y)$) and numerator ($3RP_k(y)$) of the above-mentioned equation become substantially equal.

On the other hand, in the case where there are many flicker components, the values of the denominator ($RP_{k-1}(y)+RP_k(y)+RP_{k+1}(y)$) and numerator ($3RP_k(y)$) of the above-mentioned equation differ from each other, resulting in a value that deviates from 1.

The flicker component index value $FL_k(y)$ roughly representing flicker components is extracted from images in accordance with the above-mentioned equation, and then frequency analysis based on a one-dimensional discrete Fourier transform (DFT) is performed on the flicker component index value $FL_k(y)$ mentioned above. Here, data elements are taken out from the flicker component index value $FL_k(y)$ in such a way that the number of elements of data used for the DFT corresponds to one cycle of flicker, and a ratio calculated from the zeroth-order (DC) and first-order (100 Hz) powers of the frequency spectrum obtained by the DFT is subjected to a thresholding process to thereby detect flicker.

When summarized as equations, the above processing can be represented by the following equations.

[Eq. 1]

$$FL_k(y) = 3RP_k(y)/(RP_{k-1}(y)+RP_{k+1}(y)) \quad \text{(Equation 1)}$$

$$fFL_k(n) = DFT(FL_k(y)) \quad \text{(Equation 2)}$$

$$PR_k = \frac{\sqrt{Re(fFL_k(1))^2 + Im(fFL_k(1))^2}}{\sqrt{Re(fFL_k(0))^2 + Im(fFL_k(0))^2}} \quad \text{(Equation 3)}$$

It should be noted that in the calculation equation for the flicker ratio ($PR_k$) in (Equation 3), the denominator corresponds to the zeroth order (DC) power of the frequency spectrum obtained by the DFT, and the numerator corresponds to the first order (100 Hz) power of the frequency spectrum obtained by the DFT.

Re denotes real part and Im denotes imaginary part.

Of the above-mentioned equations,

Equation 1 is a calculation equation for the flicker component index value $FL_k(y)$ based on the row-by-row signal intensities: $RP_{k-1}(y)$, $RP_k(y)$, and $RP_{k+1}(y)$ for the three frames described above, frames k−1 to k+1.

Equation 2 is a calculation equation representing a one-dimensional discrete Fourier transform (DFT) process on the flicker component index value $FL_k(y)$.

Equation 3 is a calculation equation for a ratio calculated from the zeroth-order (DC) and first-order (100 Hz) powers of the frequency spectrum obtained by the DFT in Equation 2.

A larger value of the flicker ratio ($PR_k$) calculated by Equation 3 indicates that more flicker components are contained in image frame k.

The flicker scene determining section 202 executes detection of a flicker scene by executing comparison between the flicker ratio ($PR_k$) calculated by Equation 3 mentioned above, and a pre-specified threshold.

If the flicker ratio ($PR_k$) calculated by Equation 3 is equal to or higher than a pre-specified flicker scene determination threshold (Tha), it is determined that the corresponding frame k is a flicker scene, that is, an image frame in which the influence of flicker is present.

That is, if the determination expression:

$$PR_k \geq Tha$$

holds, it is determined that frame k is a flicker scene, that is, an image frame in which the influence of flicker is present. If the above-mentioned determination expression does not hold, it is determined that frame k is not a flicker scene, that is, frame k is an image scene in which the influence of flicker is not present.

If it is not determined that frame k is a flicker scene, calculation of correction coefficients for removing flicker, and a correction process using the flicker correction coefficients are not performed. The calculation of correction coefficients for removing flicker, and the correction process using the flicker correction coefficients are executed for scenes (frames) that are determined to be flicker scenes.

It should be noted that in the present processing, when it is desired to ensure robustness of the processing with respect to various shooting scenes, it is also possible to perform the calculation process of the flicker component index value $FL_k$ represented by (Equation 1) mentioned above for not only frame k but also for the preceding and following frames, and perform the processing on flicker components that are synthesized by the same technique as a waveform synthesis process based on the reliability of data described later by using $FL_{k-1}$, $FL_k$, and $FL_{k+1}$.

Next, a description will be given of processing executed by the still frame detecting section 203 in the block diagram shown in FIG. 6. The still frame detecting section 203 detects frames with little motion of the subject or the camera itself, in order to improve the precision of correction coefficients calculated in the calculation process of flicker correction coefficients which is executed as processing of the flicker component calculating section 205 in the subsequent stage.

The still frame detecting section 203 detects frames with no motion of the subject. It should be noted, however, that since the flicker component calculating section 205 in the subsequent stage performs flicker component calculation by using a one-dimensional signal intensity integrated with respect to the row direction, the still frame detecting section 203 may perform still frame determination based on the presence/absence of motion in the vertical direction. That is, it is unnecessary to perform a strict still determination process with respect to motion in the horizontal direction.

The still frame detecting section 203 performs still frame detection based on the difference value in the row-by-row signal intensity RP calculated by the integration processing section 201 between frames.

In the case of a shooting scene in which flicker is contained, motion of stripe patterns as flicker occurs between frames that make up moving images. There is a possibility that due to this motion of flicker, it is determined that the frames are not still frames even through the subject or the camera is still.

For example, if the power supply frequency is 50 Hz and the frame rate of the image sensor is 60 fps, which are the conditions assumed in the present embodiment, the positions of the horizontal stripes of flicker that appear in shot images vary in a cycle of three frames as described above.

Therefore, when still frame detection is performed by executing motion discrimination based on comparison between the preceding and following adjacent frames, there is a possibility that luminance variation due to flicker is detected and erroneous processing is performed.

To avoid such erroneous detection, signal intensities (RP) for a plurality of consecutive frames corresponding to the frame cycle in which flicker of the same phase occurs, which is three frames in this embodiment, are integrated with respect to the frame (temporal) direction to acquire RP with the influence of flicker mitigated, and still frame detection is performed by using the signal intensity RP of the plurality of frames corresponding to this flicker cycle.

It should be noted that in the following description, "flicker cycle" and "same-flicker-occurring-frame cycle" are defined as follows.

(a) Flicker cycle: the cycle of flicker, which is 1/100 sec in the example (100 Hz) shown in FIG. 1

(b) Same-flicker-occurring-frame cycle: the cycle of frames in which the flicker waveform of the same phase occurs, which is three frames (=1/20 sec) in the example shown in FIG. 1

Figure 7:
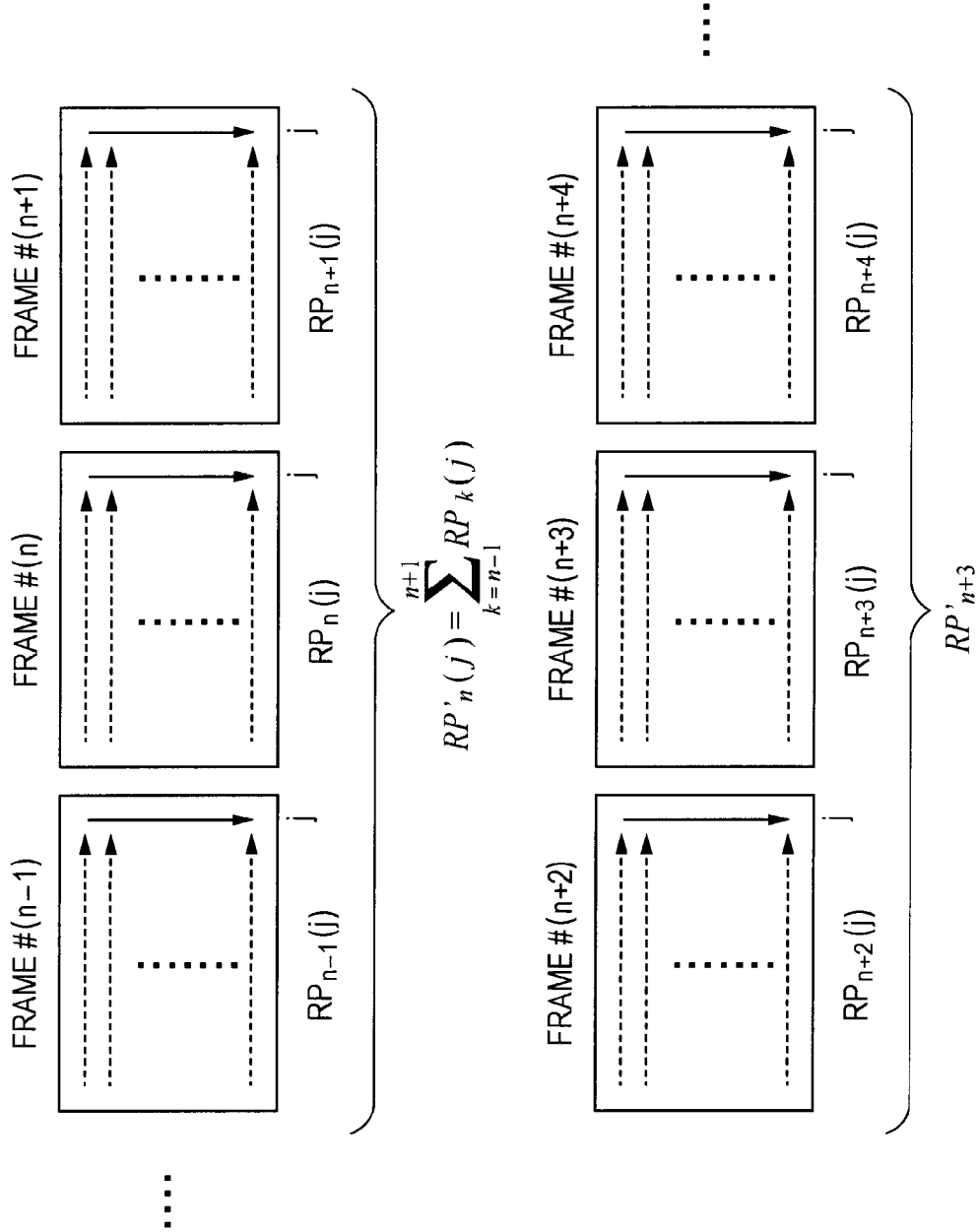
FIG. 7 is a diagram explaining about a still frame detection process executed by a still frame detecting section 203.

Referring to FIG. 7, a description will be given of a still frame detection process executed by the still frame detecting section 203. In FIG. 7, consecutive image frames #(n−1) to #(n+3) are shown.

First, row-by-row signal intensities $RP_{n-1}(j)$, $RP_n(j)$, and $RP_{n+1}(j)$ are calculated respectively for the three consecutive frames in the first half, frames #(n−1) to #(n+1), and the integrated signal intensity $RP'_n(j)$ of these plurality of frames is calculated in accordance with the following equation.

$$RP'_n(j) = \sum_{k=n-1}^{n+1} RP_k(j) \qquad \text{[Eq. 2]}$$

Likewise, row-by-row signal intensities $RP_{n+2}(j)$, $RP_{n+3}(j)$, and $RP_{n+4}(j)$ are calculated respectively for the next three consecutive frames, frames #(n+2) to #(n+4), and the integrated signal intensity $RP'_{n+3}(j)$ of these plurality of frames is calculated in accordance with the following equation.

$$RP'_{n+3}(j) = \sum_{k=n+2}^{n+4} RP_k(j) \qquad \text{[Eq. 3]}$$

In this way, Sk calculated from the sum of the absolute values of element-to-element differences between a first plural-frames integrated signal intensity $RP'_n$ obtained by integrating RP calculated every three frames corresponding to the "same-flicker-occurring-frame cycle" in which flicker of the same phase occurs, and a second plural-frames integrated signal intensity $RP'_{n+3}$ obtained from the next three consecutive frames is defined as a still frame evaluation function. The still frame evaluation function Sk is calculated in accordance with the following equation.

$$S_k = \sum_i D\_RP'_k(j) \qquad \text{[Eq. 4]}$$

$$k = 2, 5, \ldots, n-3, n, n+3, \ldots$$

where $$D\_RP'_k(j) = |RP'_k(j) - RP'_{k-3}(j)|$$

The still frame evaluation function Sk calculated in accordance with the above-mentioned equation becomes larger in value as the difference in the plural-frames integrated signal intensity calculated every three frames becomes larger. Therefore, for images with motion, the value of the still frame evaluation function Sk also becomes large.

The still frame detecting section 203 detects a still frame by comparing the still frame evaluation function Sk calculated in accordance with the above-mentioned equation, with a prespecified still frame determination threshold (Thb). That is, if the determination expression:

$$Sk \geq Thb$$

holds, it is determined that the corresponding frame k is not a still frame. If the above-mentioned determination expression does not hold, it is determined that frame k is a still frame.

It should be noted that the process for detecting a still frame is not limited to the method mentioned above. It is possible to use various existing processes as necessary, such as detection based on the difference between frames.

Next, a description will be given of processing executed by the flicker component calculating section 205 in the process block diagram of FIG. 6. When detection of still frames equal to or more than three consecutive frames (same-flicker-occurring-frame cycle) has been executed in the processing of the still frame detecting section 203 in the previous stage, the flicker component calculating section 205 can perform a flicker component calculation process by using the detected still image frames.

Figure 8:
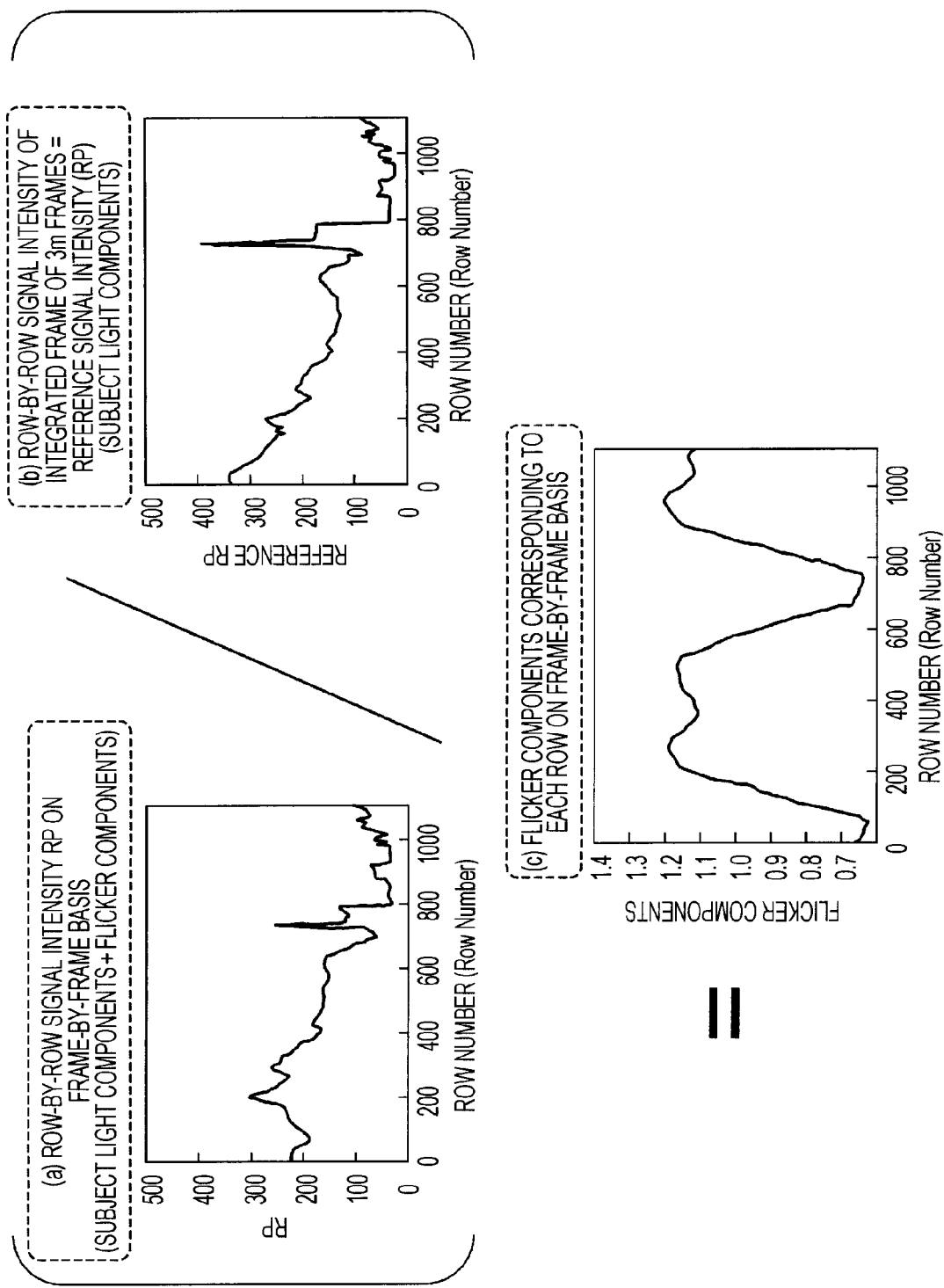
FIG. 8 is a diagram explaining about a flicker component calculation process executed by a flicker component calculating section 205.

Referring to FIG. 8, a flicker component calculation process executed by the flicker component calculating section 205 will be described. FIG. 8 shows the following pieces of data (a) to (c).

(a) Row-by-row signal intensity RP on a frame-by-frame basis (subject light components+flicker components)

(b) Plural-frames integrated signal intensity on a row-by-row basis of an integrated frame of 3m frames=reference signal intensity (RP) (subject light components)

(c) Flicker components corresponding to each row on a frame-by-frame basis

FIG. 8 illustrates that, with respect to (a) to (c) mentioned above, (c) flicker components corresponding to each row on a frame-by-frame basis can be calculated as $(a)/(b)=(c).$ It should be noted that flicker correction coefficients applied to flicker correction are basically components that are in anti-phase to the flicker components calculated here. That is, the flicker correction coefficients are correction coefficients by which to multiply the pixel values of individual rows in order to eliminate the flicker components in the individual rows, and are multiplicative coefficients formed by components that are in anti-phase to the flicker components. The correction coefficients are calculated on a row-by-row basis, and finally, in the multiplication section 208 shown in FIG. 8, a process of multiplying an input image by the correction coefficients on a row-by-row basis is performed. The multiplication section 208 corresponds to a correcting section that executes a correction process using the flicker correction coefficients. Through this correction coefficient multiplying process performed in the upper remaining section 208, the corrected image 252 removed of flicker components is generated.

Each of the pieces of data (a) to (c) shown in FIG. 8 will be described.

(a) Row-by-row signal intensity RP on a frame-by-frame basis (subject light components+flicker components) represents a row-by-row one-dimensional signal intensity (RP: Row Profile) for each individual frame which is calculated in the integration processing section 201.

As (b) plural-frames integrated signal intensity on a row-by-row basis of an integrated frame of 3m frames=reference signal intensity (RP) (subject light components), a plural-frames integrated signal intensity RP on a row-by-row basis obtained from the integration result of the three consecutive frames of images detected in the processing of the still frame detecting section 203 in the previous stage can be used.

It should be noted that m is an integer not smaller than 1, and a greater number of 3m frames may be used, such as 6 frames, 9 frames, . . . , and 30 frames. It should be noted that the reason why the unit of integration is set as 3m frames, that is, a number of frames that is a multiple of 3 is as described below.

In the present example, shooting of images at 60 fps is executed under illumination with luminance variation at 100 Hz, and flicker having a three-frame cycle (same-flicker-occurring-frame cycle) occurs. Therefore, an image integrated over 3m frames of still images is an image whose flicker components have been cancelled out. As a result, in the row-by-row signal intensity RP shown in FIG. 8(*b*), flicker components are mitigated, and only the light components attributable to the subject substantially remain.

In this way, to calculate a row-by-row one-dimensional signal intensity (RP) made up of only the light components purely attributable to the subject, an image integrated over 3m frames corresponding to multiples of the same-flicker-occurring-frame cycle is used.

The flicker component calculating section 205 computes the pieces of data (a) and (b) shown in FIG. 8, that is, these pieces of data:

(a) Row-by-row signal intensity RP on a frame-by-frame basis (subject light components+flicker components); and (b) Plural-frames integrated signal intensity on a row-by-row basis of an integrated frame of 3m frames=reference signal intensity (RP) (subject light components), thereby calculating (c) Flicker components corresponding to each row on a frame-by-frame basis.

That is, as shown in FIG. 8, (c) flicker components corresponding to each row on a frame-by-frame basis are calculated as $(a)/(b)=(c).$ The flicker components are calculated for individual scan lines (row by row) in the image sensor.

In this way, the flicker component calculating section 205 compares the integral value of the row-by-row signal intensity of an image frame whose flicker components are to be detected, and a plural-frames integrated signal intensity representing the row-by-row signal intensity of an integrated frame obtained by summing the signal values of the corresponding pixels in reference frames, thereby detecting flicker components contained in individual rows of the image frame whose flicker components are to be detected.

It should be noted that reference frames are selected from still frames detected by the still frame detecting section 203, and represent a set of consecutively shot image frames that make up the reference frames defined as a plurality of image frames included in one unit of the frame cycle in which flicker of the same phase occurs.

It should be noted that this flicker component calculation process executed by the flicker component calculating section 205 is desirably carried out for each of the color channels in the color arrangement that make up the image sensor. That is, in the case of an image sensor having the Bayer arrangement, it is preferable to estimate the flicker components for each of R, G, and B. This is because the decay characteristic of the phosphor included in the fluorescent lamp differs for each wavelength of light, and the influence on the shot image also differs for each color channel.

It should be noted that as the 3m frames used as image frames for calculation of the plural-frames integrated signal intensity=reference signal intensity (RP) that is used when calculating (c) flicker components corresponding to each row on a frame-by-frame basis shown in FIG. 8, various settings are possible, such as 3 frames and 6 frames.

Figure 9:
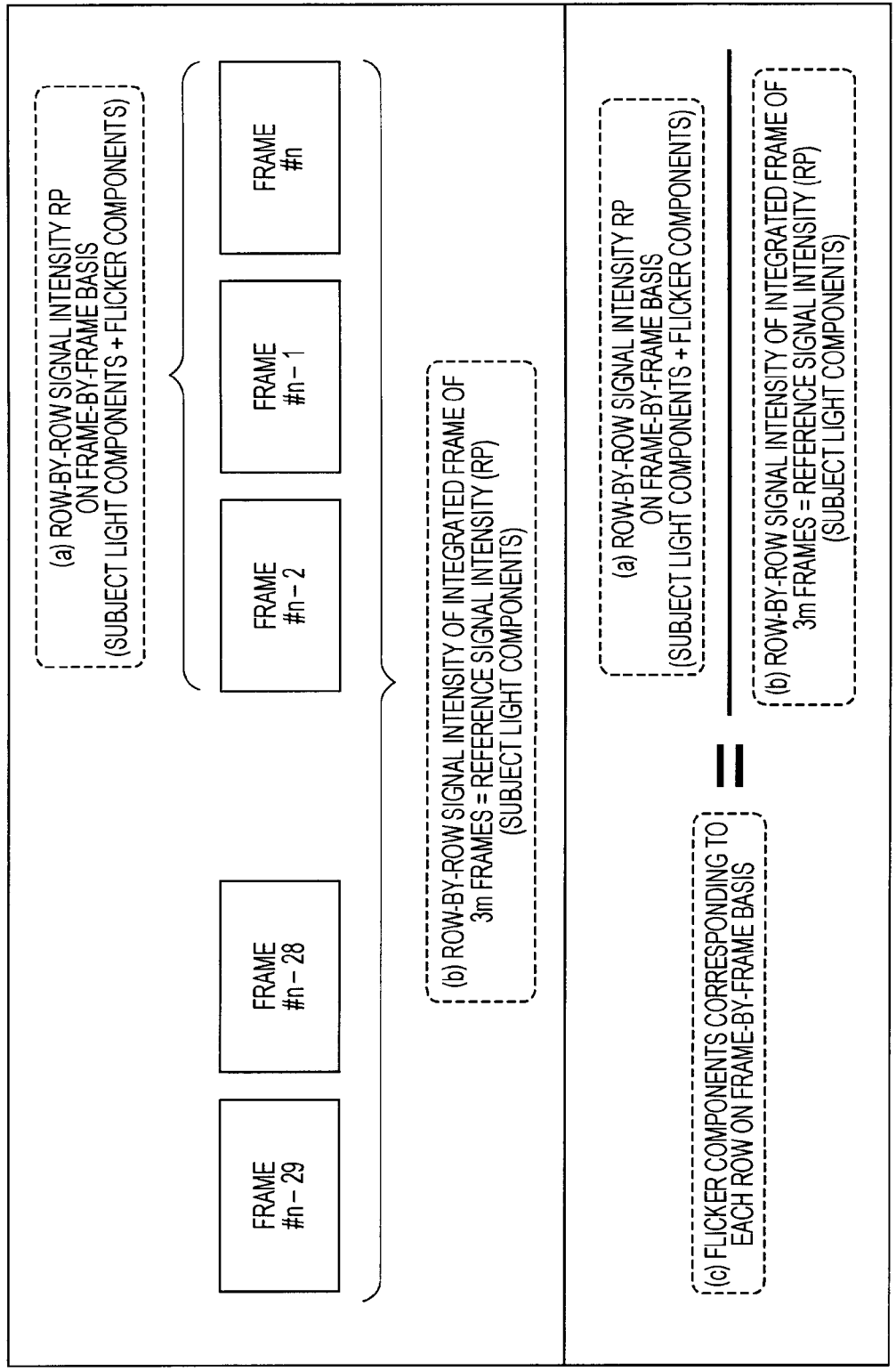
FIG. 9 is a diagram explaining about a flicker component calculation process executed by a flicker component calculating section 205.

For example, as shown in FIG. 9, for example, a configuration may be also adopted in which consecutive frames (for example, 30 frames) prior to calculation of flicker components are used.

It should be noted that the setting shown in FIG. 9 is an example. The frames for calculating the reference RP may be set as any frames that are in the neighborhood of the frame whose flicker components are to be calculated, and are consecutive frames that have been determined as still images.

As described above, flicker correction coefficients are basically components that are in anti-phase to the flicker components calculated here.

A plurality of consecutive frames (three frames in this example) that make up one cycle of the frame cycle used for estimation of the flicker components (same-flicker-occurring-frame cycle) are defined as reference frames. Correction is performed by applying the flicker correction coefficients calculated for the reference frames to frames other than the reference frames. For example, in the example shown in FIG. 9, when frames from frame #n onwards are to be corrected, a set of frame #n−2 to frame #n serves as the reference frames.

When executing flicker correction, flicker correction coefficients calculated by using reference frames are used. The flicker correction coefficients calculated by using the reference frames are defined as reference flicker correction coefficients. Finally, in the multiplication section 208 shown in FIG. 6, a process is performed which multiples an input image on a row-by-row basis by flicker correction coefficients that are phase-adjusted by using the reference flicker correction coefficients. Through this correction coefficient multiplying process, the corrected image 252 removed of flicker components is generated.

The calculation process of flicker correction coefficients (reference flicker correction coefficients) using reference frames is executed as processing in the flicker component synthesizing section 206, and the flicker correction coefficient calculating section 207 shown in FIG. 6.

The flicker component synthesizing section 206 calculates higher precision flicker components corresponding to one flicker cycle by using flicker components corresponding to the reference frames.

It should be noted that the flicker cycle is, for example, 1/100 sec in the example (100 Hz) shown in FIG. 1. Flicker components corresponding to this one cycle unit of flicker pattern are calculated. Processing is performed while assuming that the flicker components for this one cycle repeatedly occurs.

The flicker correction coefficient calculating section 207 uses the high precision flicker components for one cycle of flicker cycle which are generated by the flicker component synthesizing section 206 to thereby calculate flicker correction coefficients (reference flicker correction coefficients) that are in anti-phase to the flicker components.

These processes will be described below.

First, a description will be given of the process of calculating high precision flicker components for one cycle, which is executed by the flicker component synthesizing section 206.

The flicker components corresponding to each frame have already been calculated in the flicker component calculating section 205 as described above with reference to FIG. 8. Therefore, by using the flicker components corresponding to each frame, flicker components for one flicker cycle can be extracted.

However, in the processing according to the present invention, rather than simply cutting out flicker components for one cycle from the flicker components in reference frames, as described below, flicker components with higher precision are extracted to ensure robustness of the correction process.

The process of calculating high precision flicker components executed by the flicker component synthesizing section 206 will be described in detail with reference to FIG. 10.

Graphs shown in FIG. 10(a), (b), (c) are graphs indicating flicker components in reference frames. That is, the graphs indicate flicker components extracted from three consecutive image frames (frame #n−2 to frame #n) by the technique described above.

However, even if shooting is done with appropriate exposure, dark regions where the quantity of light reflected from an object is not sufficient generally exist within a shooting scene. It is highly likely that flicker components are not extracted accurately in such regions of low luminance.

Figure 10:
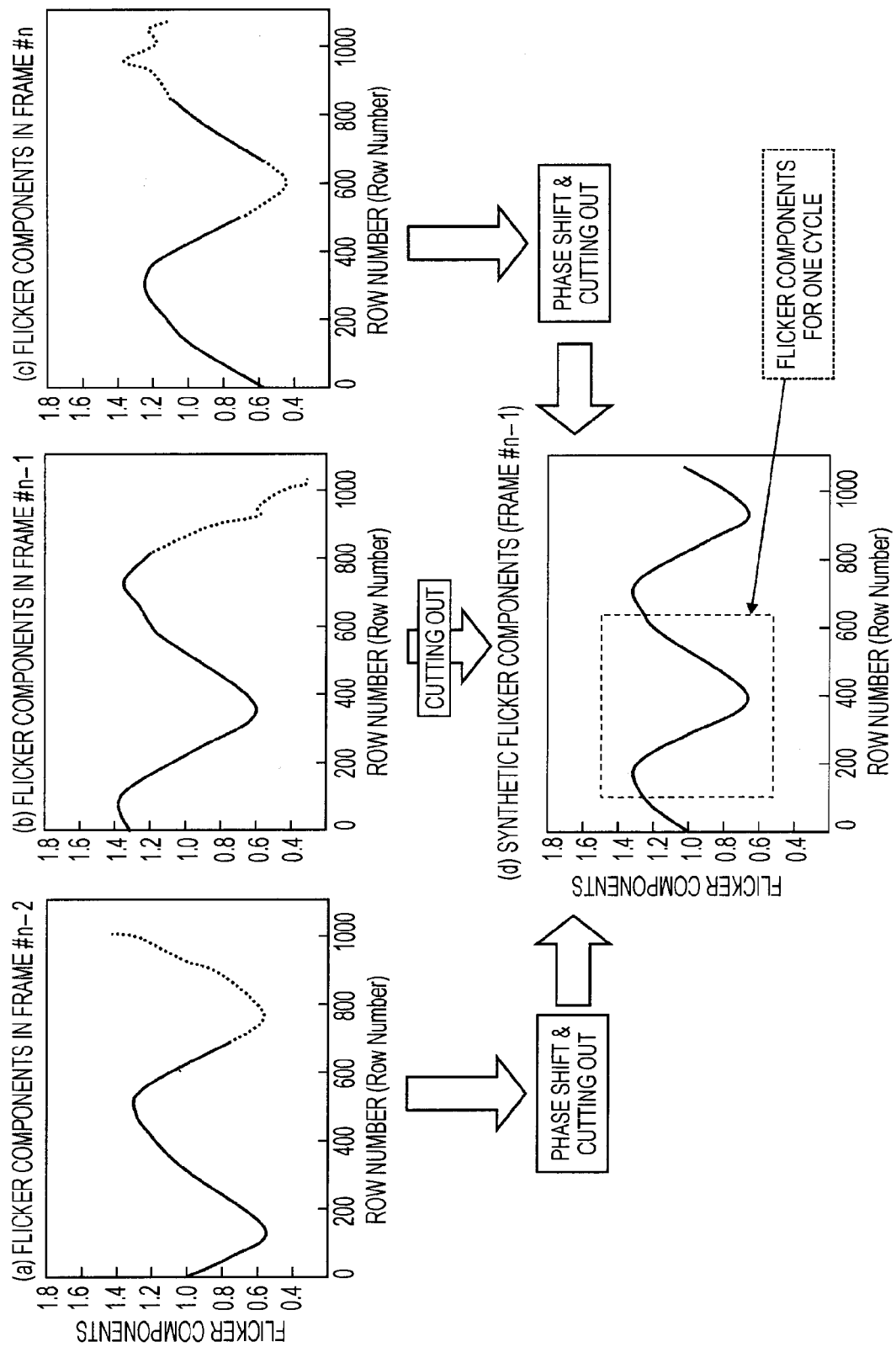
FIG. 10 is a diagram explaining about a calculation process of high precision flicker components executed by a flicker component synthesizing section 206.

For example, in each of the graphs (a) to (c) shown in FIG. 10, the location indicated by the dotted line is, for example, a low luminance region, which is a region where the precision of flicker components is low. If correction is performed by generating flicker correction coefficients, which are formed by coefficients having an anti-phase to flicker components, from such flicker components, this means that correction is performed by using correction coefficients based on a waveform different from the actual flicker waveform, resulting in a decrease in the image quality of the image obtained after correction.

To avoid such a problem, the flicker component synthesizing section 206 calculates flicker component reliabilities based on luminance from each of reference images that make up a plurality of frames as a unit of the same-flicker-occurring-frame cycle, and on the basis of the calculated flicker component reliabilities, selects and synthesizes only flicker components in regions determined to be high in reliability, thereby generating high precision synthetic flicker components (see FIG. 10(d)).

As for the reliabilities of the flicker components in each reference frame, for example, a dark region (low luminance region) within the image is determined through a comparison process with a preset luminance threshold, by using the row-by-row signal intensity RP (see FIG. 8) described above. That is, a luminance threshold (Thc) is defined in advance, and the signal intensity RP of each row in the image and the luminance threshold (Thc) are compared with each other.

Flicker components extracted from rows (scan lines) having a sufficient luminance which satisfy the determination expression:

Signal intensity $RP \geq Thc$ are determined to be valid. Flicker components extracted from rows (scan lines) with a low luminance which do not satisfy the above-mentioned determination expression are determined to be invalid. The values of the flicker components determined to be invalid are not applied to generation of synthetic flicker components. That is, the values are not used for generation of flicker correction coefficients.

Of the flicker components in the reference frames shown in FIG. 10(a) to (c), the regions indicated by the dotted lines are invalid regions with low reliability which are determined on the basis of such row-by-row luminance level determination. The regions indicated by the solid lines are valid regions with high reliability.

Of the flicker components in the reference frames shown in FIG. 10(a) to (c), only the flicker components in the regions of high precision indicated by the solid lines are synthesized to generate the synthetic flicker components shown in FIG. 10(d). Components that are in anti-phase to the synthetic flicker components are calculated as flicker correction coefficients.

It should be noted that as in the case of the reference frames shown in FIG. 10(a) to (c), between several adjacent frames that make up moving images, phase fluctuations of the flicker components due to frequency fluctuations in power supply or the like can be almost ignored. Thus, the phase shift quantity of each of the flicker components extracted from the three frames can be calculated from the flicker frequency (for example, 100 Hz), the frame rate (60 fps) of the image sensor, the total number of scan lines, and the like.

The flicker component synthesizing section 206 performs a synthesis process by using this calculated phase shift quantity of each of the flicker components, by performing phase shifting so that the respective flicker components overlap each other. That is, the flicker components in a region of a given frame which could not be extracted because of low reliability are synthesized from another frame in a phase-matched manner.

It should be noted that even the waveform of the flicker components generated through such a synthesis process can become discontinuous. For such regions, an interpolation process is applied using a spline function or the like.

The flicker component portion synthesizing section 206 generates a continuous synthetic flicker waveform as shown in FIG. 10(d), through a synthesis process and an interpolation process of the flicker components in reference frames made up of a plurality of frames in this way.

The phase shift quantity calculating section 204 computes the shift quantity between each of the phases of the flicker components in the reference frames used in the flicker component synthesizing section, and the phase of the flicker components in a frame to which flicker correction coefficients are to be applied. The phase shift quantity calculating section 204 synthesizes flicker components extracted from a plurality of frames, for example, and estimates the phase shift quantity of flicker from flicker components for one cycle of flicker or more. Here, it is possible to perform phase estimation that takes a deviation in imaging frame rate (a minute deviation from 60 fps) and fluctuations in flicker phase due to fluctuations in power supply frequency into consideration, contributing to an improvement in the robustness of the correction process.

The flicker correction coefficient calculating section 207 calculates flicker correction coefficients (reference flicker correction coefficients) that are in anti-phase to the flicker components, by using the high precision flicker components for one cycle which are generated by the flicker component synthesizing section 206. Finally, in the multiplication section 208 shown in FIG. 6, a process is performed which multiplies an input image row by row by flicker correction coefficients that are phase-shifted on the basis of the phases calculated in the phase shift quantity calculating section 204 mentioned above, by using the reference flicker correction coefficients. Through this correction coefficient multiplying process, the corrected image 252 removed of flicker components is generated.

It should be noted that, as described with reference to FIG. 1, the phase of flicker components varies with each captured image frame. Therefore, when performing a correction process by using flicker correction coefficients, it is necessary to acquire phase information of flicker components for each image frame, and use the flicker correction coefficients in a phase-matched manner.

The flicker correction coefficient calculating section 207 takes an input of the high precision flicker components for one cycle which are generated by the flicker component synthesizing section 206, and further, acquires sequentially updated flicker component phase information on a per reference frames basis from the phase shift quantity calculating section 204, and generates phase-matched flicker correction coefficients on a frame-by-frame basis. That is, the flicker correction coefficient calculating section 207 takes an input of flicker phase information of an image frame whose flicker is to be corrected, from the phase shift quantity calculating section 204, and generates flicker correction coefficients corresponding to the image frame which are phase-adjusted in accordance with the flicker phase information.

It should be noted that when executing flicker correction by using flicker correction coefficients, the phase shift quantity of the flicker components is necessary. The phase shift quantity of the flicker components is desirably calculated every predetermined frames.

For example, in the case of executing consecutive flicker correction for moving images at 60 fps, although the phase shift quantity corresponding to each of the first three frames that are set as the same-flicker-occurring-frame cycle can be used continuously on a per three frames basis, it is preferable to sequentially update and use the phase shift quantity on a per same-flicker-occurring-frame cycle basis, by calculating a phase shift quantity anew every pre-specified time interval or predetermined number of frames.

This is because, since some degree of frequency fluctuations is allowed for commercial power supplies, if the phase shift quantity calculated from the flicker frequency, the frame rate of the image sensor, and the total number of scan lines as described above is continuously used, when a long period of time has elapsed after flicker correction coefficients serving as a reference are estimated, the actual phase of the flicker components deviates from the phase of the correction coefficients. In the following, details of the phase shift quantity estimation executed by the phase shift quantity calculating section 204 will be described.

The phase shift quantity calculating section 204 calculates the phase shift quantity for each of individual reference frames that make up the same-flicker-occurring-frame cycle unit, which are three frames in this example, and provides the phase shift quantity to the flicker correction coefficient calculating section 207. It should be noted that the phase shift quantity calculating section 204 calculates a phase shift quantity updated by selecting new reference frames, at preset time intervals or frame intervals, and provides the phase shift quantity to the flicker correction coefficient calculating section 207.

The phase shift quantity calculating section 204 performs by frequency analysis of the flicker component index value $FL_k$ represented by (Equation 1) described above.

As described above, by using row-by-row signal intensities for a plurality of consecutive frames (three frames in the present example) for the "same-flicker-occurring-frame cycle" which make up reference frames, the flicker component index value $FL_k(y)$ corresponding to frame k is calculated in accordance with the following equation.

$$FL_k(y)=3RP_k(y)/(RP_{k-1}(y)+RP_k(y)+RP_{k+1}(y))$$ (Equation 1

The phase shift quantity calculating section 204 calculates the phase shift quantity of each of frames that make up reference frames, by frequency analysis of the rough flicker components calculated by this (Equation 1). As in the flicker detection process executed by the flicker scene determining section 202 described above, the phase shift quantity calculating section 204 performs frequency analysis based on a one-dimensional discrete Fourier transform (DFT) on the flicker component index value FL. After expanding the flicker component index value FL in the frequency space by DFT, the second or higher harmonics are replaced by zero, and then an inverse DFT is performed. The signal intensity obtained by the inverse DFT is a waveform of 100 Hz corresponding to the flicker cycle extracted from FL.

The phase shift quantity calculating section 204 calculates the phase shift quantity of each of frames that make up reference frames, by determining which position in each of the frames that make up the reference frames this waveform of 100 Hz corresponding to the flicker cycle is set at.

The phase shift quantity calculating section 204 provides the phase shift quantity of each of the frames that make up the reference frames calculated in this way to the flicker correction coefficient calculating section 207.

It should be noted that as described above, the phase shift quantity calculating section 204 calculates a phase shift quantity updated by selecting new reference frames, at preset time intervals or frame intervals, and provides the phase shift quantity to the flicker correction coefficient calculating section 207.

The flicker correction coefficient calculating section 207 takes an input of high precision flicker components for one cycle which are generated by the flicker component synthesizing section 206, and further, acquires sequentially updated flicker component phase information on a per reference frames basis from the phase shift quantity calculating section 204, and generates phase-matched flicker correction coefficients on a frame-by-frame basis.

Figure 11:
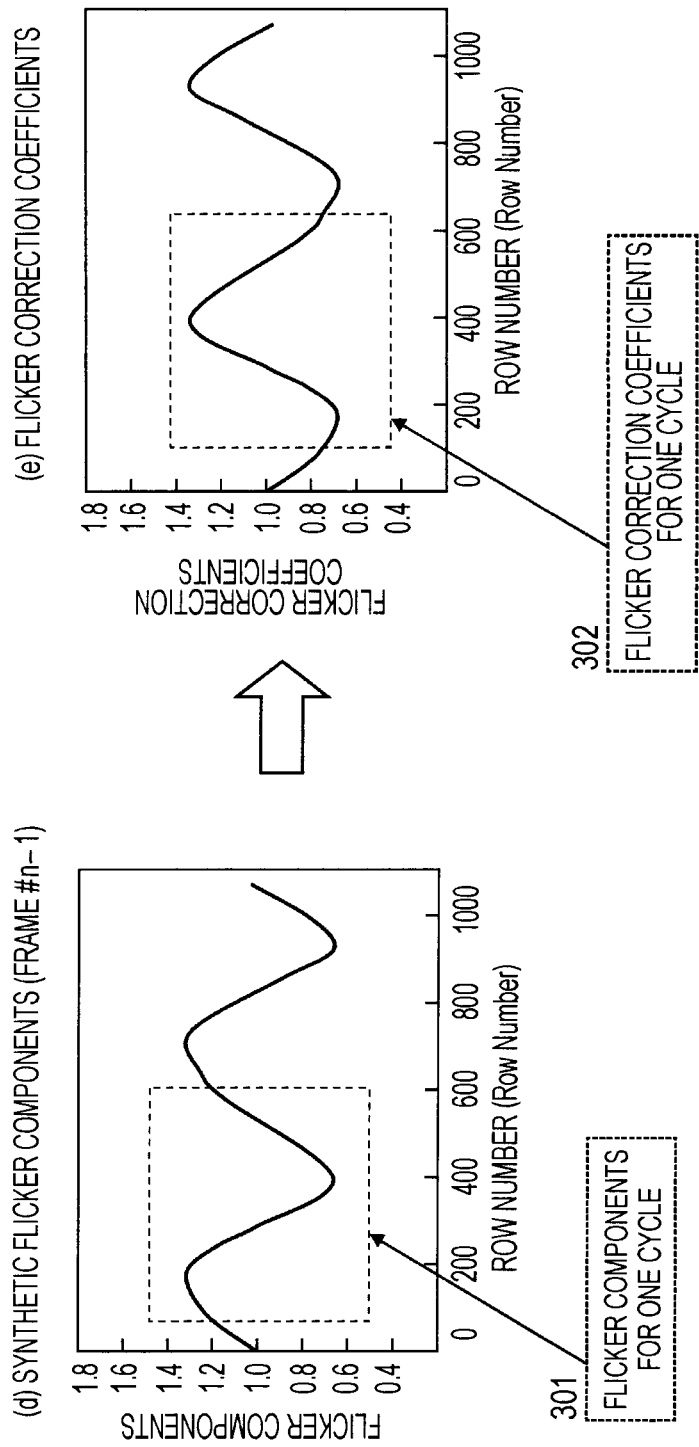
FIG. 11 is a diagram explaining about a calculation process of flicker correction coefficients executed by a flicker correction coefficient calculating section 207.

As shown in FIG. 11, the flicker correction coefficient calculating section 207 takes an input of high precision flicker components 301 for one cycle which are generated by the flicker component synthesizing section 206. The flicker components 301 correspond to the synthetic flicker components shown in FIG. 10(*d*).

The flicker correction coefficient calculating section 207 calculates flicker correction coefficients that are in anti-phase to the high precision flicker components 301 for one cycle. The resulting flicker correction coefficients are flicker correction coefficients 302 shown in FIG. 11(*e*).

Further, by using the phase shift quantity from the synthetic flicker components inputted from the phase shift quantity calculating section 204, individual flicker correction coefficients are calculated.

The flicker correction coefficient calculating section 207 outputs correction coefficients for the current frame image, and in the multiplication section 208 shown in FIG. 6, multiplication by the flicker correction coefficients is performed on a row-by-row basis.

By executing this process, as shown in FIG. 12, correction is executed by application of phase-matched correction coefficients to (A) images before correction (corresponding to the input image 251 in FIG. 6). As indicated by (B) images after correction (corresponding to the corrected image 252 in FIG. 6), images whose flicker has been eliminated or reduced are generated.

It should be noted that as described above, the above flicker correction process can be executed as either of these processes:

(1) a technique that executes processing individually on a per color signal component, for example, RGB color channel basis; and (2) a technique that calculates a single signal intensity RPk(y) on a row-by-row basis without differentiating between color channels (for example, RGB), and uses this to execute processing common to pixels corresponding to all of the color channels.

The processing according to the present invention is configured to calculate correction coefficients by calculating the flicker waveform as a waveform according to the actual illumination light, and unlike the configuration described above as the related art in which correction is performed using a model waveform such as a sine wave, it is possible to effectively eliminate flicker according to the actual luminance variation. This effect is an effect common to the processes in ne (1) and (2). Further, if correction is performed for each of the color channels of the image sensor as indicated in (1), correction that effectively eliminates color non-uniformity becomes possible.

It should be noted that to maintain the quality of the flicker-corrected image, it is preferable to perform the process of calculating and updating the reference flicker correction coefficients when still frames are detected at every predetermined cycle. Calculation of the phase shift quantity may be also performed for new reference frames at the timing when such an operation is performed.

It should be noted that while in the above-mentioned embodiment description has been given of the process example under these conditions:

the power supply frequency is 50 Hz; and the frame rate of the image sensor is 60 fps, as long as flicker in the form of horizontal stripes that occurs in the picture signal due to the light source moves in the vertical direction within the image, the present technique is valid for any combination of the power supply frequency and the frame rate of the image sensor.

When the frame rate of the image sensor becomes high, there are cases where unevenness in luminance between frames become conspicuous in the picture signal obtained after flicker in the form of horizontal stripes is corrected by the present technique. Since periodicity also exists with respect to the unevenness in luminance, on the basis of a DC value calculated for each of the color channels of each frame, in the case of a combination of 50 Hz power supply and the image sensor at 60 fps, for example, correction can be also performed by calculating, for every three frames, such a gain that makes a correction toward the median value of DC components within three frames.

[3. With Regard to an Example of the Process Sequence of the Image Processing Apparatus According to the Present Invention]

Next, an example of the sequence of processes executed by the image processing apparatus according to the present invention will be described with reference to the flowchart shown in FIG. 13.

Figure 13:
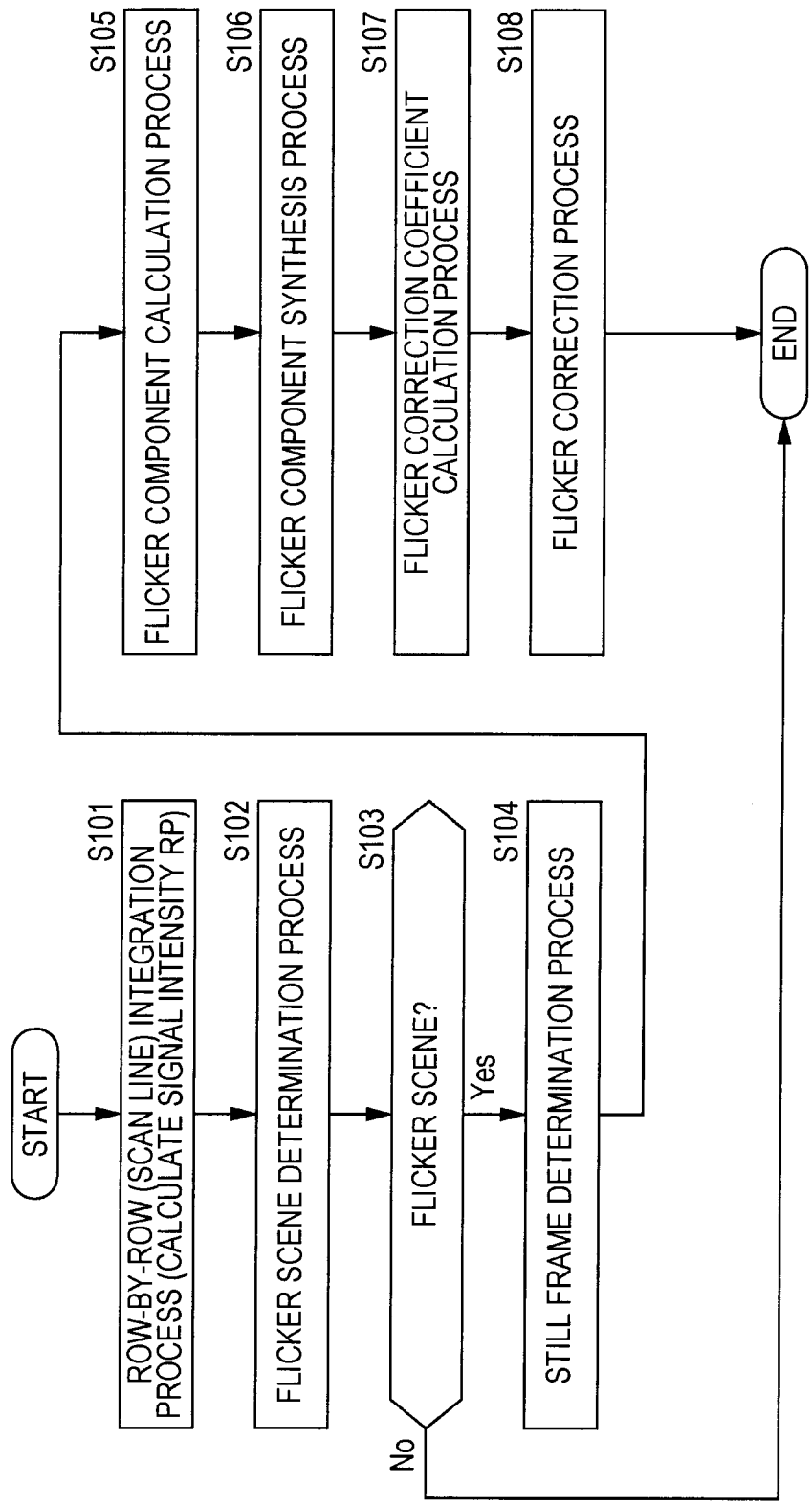
FIG. 13 is a diagram showing a flowchart explaining about an example of a process sequence executed by an image processing apparatus according to the present invention.

The flow shown in FIG. 13 is a flow showing an example of the process sequence of the flicker correction processing section 200 shown in FIG. 6. It should be noted that control of this series of processes is performed under control by the control section 150 (see FIG. 5).

The processes in individual steps of the flowchart shown in FIG. 13 will be sequentially described.

In step S101, a signal value (pixel value) integration process on a row-by-row (scan line) basis is executed.

This process is a process in the integration processing section 201 shown in FIG. 6. The integration processing section 201 performs an integration process of the signal value (pixel value) on a per scan line (row) basis in the horizontal direction of an inputted image (for example, the RAW image 251 shown in FIG. 5), thereby obtaining a row-by-row one-dimensional signal intensity (RP: Row Profile).

It should be noted that as described above, as processing modes, there are these two techniques:

(1) a technique that executes processing individually on a per color signal component, for example, RGB color channel basis; and (2) a technique that calculates a single signal intensity RPk(y) on a row-by-row basis without differentiating between color channels (for example, RGB), and uses this to execute processing common to pixels corresponding to all of the color channels.

In step S102, a flicker scene determination process is performed.

This process is a process in the flicker scene determining section 202 shown in FIG. 6.

The flicker scene determining section 202 performs a process (flicker determination) for determining whether or not a shot image has been shot under a fluorescent lamp environment that causes flicker. The flicker scene determining section 202 uses a one-dimensional discrete Fourier transform (DFT) to determine, on the basis of the power spectrum distribution, whether or not a 100-Hz flicker component is contained in one-dimensional signal intensities RP_R, RP_G, and RP_B.

By comparison between the flicker ratio ($RP_k$) calculated in accordance with the equations (Equation 1) to (Equation 3), and the pre-specified flicker scene determination threshold (Tha) described above, whether or not the frame in question is a frame containing flicker is determined on a per image frame basis.

If it is determined that the frame is a frame containing flicker, the determination in step S103 becomes Yes, and the processes from step S104 onwards are executed.

If it is determined that the frame is a frame not containing flicker, the determination in step S103 becomes No, the processes from step S104 onwards are not executed, and the flicker correction process ends. In this case, only other general signal processing is executed.

If it is determined that the frame is a frame containing flicker, and the processing proceeds to step S104, a still frame determination process is performed.

This process is a process in the still frame detecting section 203 shown in FIG. 6. The still frame detecting section 203 detects frames with little motion of the subject or the camera itself. The still frame detecting section 203 performs still frame detection based on the difference value in the row-by-row signal intensity RP calculated by the integration processing section 201 between frames.

For this process, to avoid erroneous detection due to flicker, signal intensities (RP) for a plurality of consecutive frames corresponding to the frame cycle in which flicker of the same phase occurs, which is three frames in this embodiment, are integrated with respect to the frame (temporal) direction to acquire RP with the influence of flicker mitigated, and still frame detection is performed by using the signal intensity RP of the plurality of frames corresponding to the flicker cycle. This process is the process described with reference to FIG. 7.

As described with reference to FIG. 7, still frame detection is performed by calculating the still frame evaluation function Sk, whose value becomes larger as the difference in the plural-frames integrated signal intensity calculated every plurality of frames (three frames) corresponding to the same-flicker-occurring-frame cycle becomes larger, and performing a comparison against a preset still frame determination threshold (Thb).

Next, in step S105, a flicker component detection process is executed.

This process is a process executed by the flicker component calculating section 205 shown in FIG. 6. The flicker component calculating section 205 can perform a flicker component calculation process on a per image frame basis by using the still image frames detected in step S204.

This process is the process described above with reference to FIG. 8 and FIG. 9.

As described above with reference to FIG. 8 and FIG. 9, with respect to (a) to (c) below:
(a) Row-by-row signal intensity RP on a frame-by-frame basis (subject light components+flicker components);
(b) Plural-frames integrated signal intensity on a row-by-row basis of an integrated frame of 3m frames=reference signal intensity (RP) (subject light components); and
(c) Flicker components corresponding to each row on a frame-by-frame basis,
in FIG. 8, the flicker component calculating section 205 calculates (c) flicker components corresponding to each row on a frame-by-frame basis as $(a)/(b)=(c)$.

Next, in step S106, a flicker component synthesis process is executed.

This process is a process in the flicker component synthesizing section 206 shown in FIG. 6. The flicker component synthesizing section 206 calculates flicker components with higher precision corresponding to one flicker cycle by using flicker components corresponding to reference frames.

As described with reference to FIG. 10, the flicker component synthesizing section 206 calculates flicker component reliabilities based on luminance from each of reference images that make up a plurality of frames as a unit of the same-flicker-occurring-frame cycle, and on the basis of the calculated flicker component reliabilities, selects and synthesizes only flicker components in the regions determined to be high in reliability, thereby generating high precision synthetic flicker components (see FIG. 10($d$)). It should be noted that as for the phase difference between the flicker components used for the synthesis, a value calculated from the flicker cycle, the frame rate of the sensor, the total number of rows, and the like is used.

Next, in step S107, a flicker correction coefficient calculation process is performed.

This process is a process in the flicker correction coefficient calculating section 207 shown in FIG. 6. The flicker correction coefficient calculating section 207 calculates flicker correction coefficients (reference flicker correction coefficients) that are in anti-phase to the flicker components, by using the high precision flicker components for one cycle which are generated by the flicker component synthesizing section 206. This process is the process described with reference to FIG. 11.

It should be noted that when executing this correction process, the flicker correction coefficient calculating section 207 takes an input of the high precision flicker components for one cycle which are generated by the flicker component synthesizing section 206, and further, acquires sequentially updated flicker component phase information on a per reference frames basis from the phase shift quantity calculating section 204, and generates phase-matched flicker correction coefficients on a frame-by-frame basis.

Next, in step S108, a flicker correction process is executed.

This process is a process in which the signal value (pixel value) of the image prior to undergoing correction is multiplied in the multiplication section 208 by each of the correction coefficients calculated in the flicker correction coefficient calculating section 207 shown in FIG. 6. The correction coefficients are generated on a row-by-row basis, and correction is executed by multiplying the signal values of individual rows of an input image by the row-by-row correction coefficients.

It should be noted that as described above, this process may be configured to perform a correction process on a per color signal basis by calculating independent correction coefficients for each of color signals (color channels), or perform a process of using a common correction coefficient that is set on a row-by-row basis to all of the pixels forming each row without differentiating between the color signals.

When performing a correction process on a per color signal basis, for example, the following process is executed. The integration processing section 201 calculates the integral value of the row-by-row signal intensity individually for each of the color signals (color channels), the flicker component calculating section 205 detects flicker components for each of the individual color signals, the flicker correction coefficient calculating section 207 calculates flicker correction coefficients for each of the individual color signals, and the multiplication section 208 as a correcting section executes a correction process using the flicker correction coefficients for each of the individual color signals which are calculated by the flicker correction coefficient calculating section 207.

In this way, in the present invention, flicker components that faithfully reproduce the actual luminance variation of illumination are analyzed, and a correction process is executed using flicker correction coefficients based on this accurate flicker waveform. Thus, a flicker removal process can be performed more effectively.

[4. With Regard to Processing Corresponding to a Wide Dynamic Range Image]

As a process for shooting images with a wide dynamic range, a technique of synthesizing a plurality of images with different exposure times is known.

In such wide dynamic range imaging, imaging is performed while varying the exposure time of the image sensor periodically, and a wide dynamic range image is obtained by an image synthesis process according to the luminance level of each pixel or the like. That is, an image with a wide dynamic range is generated through such an image synthesis process that pixel values in the long exposure image are applied to low luminance pixel portions, and pixel values in the short exposure image are used for high luminance pixel portions. It should be noted that when setting each pixel value, a pixel value calculation process for keeping the overall consistency is performed.

Through such a process, it is possible to obtain an image with a wide dynamic range which cannot be obtained with images shot with a constant exposure time.

When performing such a wide dynamic range image generation process, by applying the flicker correction described above as a process prior to synthesizing of images with different exposure times, a wide dynamic range image with its flicker suppressed can be generated.

For example, flicker may be detected for every image frames having the same exposure time, and the same flicker correction process as in the embodiment described above may be performed. When shooting is performed with a plurality of exposure times, depending on the exposure time, saturated pixels or pixels with extremely low values can sometimes exist. In such a case as well, by determining the reliability of each extracted flicker component on the basis of the pixel value, and performing a synthesis process of flicker components between frames, it is possible to perform flicker correction through setting of optimum flicker correction coefficients.

As described above, the image processing apparatus according to the present invention extracts flicker components corresponding to illumination light used when shooting images from the shot images, and synthesizes a flicker waveform to calculate correction coefficients according to the actual flicker waveform of a light source (such as a fluorescent lamp), thereby realizing a flicker correction process using the calculated correction coefficients. The idea of the present technique is valid not only for fluorescent lamps but also for other illumination environments, as long as the light source is a time-varying one using a commercial power supply. In particular, in cases where the influence of flicker on the image becomes conspicuous, such as wide dynamic range shooting and high frame rate shooting, very effective flicker removal/correction is realized because model approximation by a sine wave or the like is not performed.

The present invention has been described above in detail with reference to specific embodiments. However, it is obvious that a person skilled in the art can make various modifications to and substitutions for the embodiments without departing from the scope of the present invention. That is, the present invention has been disclosed by way of example, and should not be construed restrictively. The scope of the present invention should be determined by reference to the claims.

Also, the series of processes described in the specification can be executed by hardware, software, or a composite configuration of both. If the processes are to be executed by software, the processes can be executed by installing a program recording the process sequence into a memory in a computer embedded in dedicated hardware, or can be executed by installing the program into a general purpose computer capable of executing various processes. For example, the program can be pre-recorded on a recording medium. Other than being installed into a computer from a recording medium, the program can be received via a network such as a local area network (LAN) or the Internet, and installed into a recording medium such as a built-in hard disk.

It should be noted that the various processes described in the specification may be executed not only on the time series as described but may be executed in parallel or individually depending on the throughput of the device executing the processes. Also, the term system as used in this specification refers to a logical aggregation of a plurality of devices, and is not limited to one in which the constituent devices exist within the same casing.

INDUSTRIAL APPLICABILITY

As has been described in the foregoing, according to the configuration of an embodiment of the present invention, a configuration is realized which effectively removes or reduces flicker that occurs in image data shot with an X-Y address scanning type imaging device such as a CMOS, under an illumination environment such as a fluorescent lamp with luminance variation. An image processing apparatus according to the present invention calculates the integral value of the row-by-row signal intensity of an image to be corrected from which to remove flicker, and uses this integral value to detect flicker components contained in individual rows of an image frame. The detected flicker components represent data according to the actual flicker waveform of the illumination. Flicker correction coefficients formed by an anti-phase pattern of the flicker components are calculated, and a correction process using the flicker correction coefficients is executed. Through this process, correction according to the actual flicker waveform becomes possible, and effective removal of flicker is realized.

REFERENCE SIGNS LIST 100 imaging apparatus
101 imaging section
102 signal processing section
103 codex (encode/decode processing section)
104 recording/reproducing section
120 recording medium
130 display section
150 control section
151 memory
200 flicker correction processing section
201 integration processing section
202 flicker scene determining section
203 still frame detecting section
204 phase shift quantity estimating section
205 flicker component calculating section
206 flicker component synthesizing section
207 correction coefficient calculating section
208 multiplication section
251 image
252 corrected image

The invention claimed is:

1. An image processing apparatus comprising: an integration processing section that takes an input of image data shot with an X-Y address scanning type imaging device, and calculates an integral value of a row-by-row signal intensity;

a flicker component calculating section that calculates a flicker waveform of actual luminance variation, and detects flicker components contained in individual rows of an image frame by using the integral value of the row-by-row signal intensity of the actual luminance variation calculated based on the flicker waveform of actual luminance variation at the time of image shooting;

a flicker correction coefficient calculating section that calculates flicker correction coefficients formed by an anti-phase pattern of the flicker components calculated by the flicker component calculating section; and a correcting section that executes a correction process using the flicker correction coefficients calculated by the flicker correction coefficient calculating section.

2. The image processing apparatus according to claim 1, wherein the flicker component calculating section performs a process of detecting flicker components contained in individual rows of an image frame whose flicker components are to be detected, by comparing between:

an integral value of a row-by-row signal intensity of the image frame whose flicker components are to be detected; and a plural-frames integrated signal intensity representing a row-by-row signal intensity of an integrated frame obtained by summing signal values of corresponding pixels in reference frames, the reference frames being defined as a plurality of image frames included in one unit of a frame cycle in which flicker of the same phase occurs.

3. The image processing apparatus according to claim 2, wherein:

the image processing apparatus further comprises a still frame detecting section that detects still frames with no subject motion from among consecutive image frames; and the flicker component calculating section selects the reference frames from among the still frames detected by the still frame detecting section.

4. The image processing apparatus according to claim 3, wherein:

the flicker correction coefficient calculating section takes an input of flicker phase information of an image frame whose flicker is to be corrected, from a phase shift quantity calculating section, and calculates flicker correction coefficients corresponding to the image frame which are phase-adjusted in accordance with the flicker phase information.

5. The image processing apparatus according to claim 4, wherein:

the image processing apparatus further comprises a flicker component synthesizing section that generates synthetic flicker components by selecting only flicker components of high reliability from the flicker components for each frame which are calculated by the flicker component calculating section, and synthesizing flicker components in a plurality of frames; and the flicker correction coefficient calculating section calculates flicker correction coefficients formed by an anti-phase pattern of the synthetic flicker components.

6. The image processing apparatus according to claim 5, wherein the flicker component synthesizing section performs a process of determining reliabilities of the flicker components for each frame on a basis of luminance information of an image frame, and selects, as the flicker components of high reliability, only flicker components corresponding to pixels having a luminance equal to or higher than a pre-specified luminance threshold.

7. The image processing apparatus according to claim 6, wherein:

the integration processing section calculates the integral value of the row-by-row signal intensity for each of individual color signals (color channels);

the flicker component calculating section detects the flicker components for each of the individual color signals;

the flicker correction coefficient calculating section calculates the flicker correction coefficients for each of the individual color signals; and the correcting section executes the correction process using the flicker correction coefficients for each of the individual color signals which are calculated by the flicker correction coefficient calculating section.

8. The image processing apparatus according to claim 7, wherein:

the image processing apparatus further comprises a flicker scene determining section that determines whether or not an input image has been shot under an illumination environment that causes flicker; and in the flicker scene determining section, if the image has been shot under the illumination environment that causes flicker, the correction process is executed by calculating the flicker correction coefficients.

9. The image processing apparatus according to claim 8, wherein:

the image processing apparatus executes the correction process using the flicker correction coefficients for each set of consecutively shot images with the same exposure time, as a process prior to generating a wide dynamic range image by synthesizing a plurality of images with different exposure times.

10. The image processing apparatus according to claim 9, wherein the X-Y address scanning type imaging device is a complementary metal oxides semiconductor (CMOS) imaging device.

11. An imaging apparatus comprising:
an imaging section; and
a signal processing section that executes image processing according to claim 10.

12. A signal processing method which is executed in an image processing apparatus, comprising:

an integration processing step of an integration processing section taking an input of image data shot with an X-Y address scanning type imaging device, and calculating an integral value of a row-by-row signal intensity of the actual luminance variation at the time of image shooting;

a flicker component calculating step of a flicker component calculating section that calculates a flicker waveform of actual luminance variation, and detects flicker components contained in individual rows of an image frame by using the integral value of the row-by-row signal intensity of the actual luminance variation calculated based on the flicker waveform of actual luminance variation at the time of image shooting;

a flicker correction coefficient calculating step of a flicker correction coefficient calculating section calculating flicker correction coefficients formed by an anti-phase pattern of the flicker components calculated in the flicker component calculating step; and a correcting step of a correcting section executing a correction process using the flicker correction coefficients calculated in the flicker correction coefficient calculating step.

13. A non-transitory computer-readable medium containing a computer program that causes, when executed, signal processing to be executed in an image processing apparatus, comprising:

an integration processing step of causing an integration processing section to take an input of image data shot with an X-Y address scanning type imaging device, and calculate an integral value of a row-by-row signal intensity of the actual luminance variation at the time of image shooting;

a flicker component calculating step of causing a flicker component calculating section that calculates a flicker waveform of actual luminance variation, and detects flicker components contained in individual rows of an image frame by using the integral value of the row-by-row signal intensity of the actual luminance variation calculated based on the flicker waveform of actual luminance variation at the time of image shooting;

a flicker correction coefficient calculating step of causing flicker correction coefficient calculating section to calculate flicker correction coefficients formed by an anti-phase pattern of the flicker components calculated in the flicker component calculating step; and a correcting step of causing a correcting section to execute a correction process using the flicker correction coefficients calculated in the flicker correction coefficient calculating step.

* * * * *